United States Patent
Zhang et al.

(10) Patent No.: US 12,473,206 B2
(45) Date of Patent: Nov. 18, 2025

(54) SALT-ASSISTED PHASE TRANSFORMATION OF TRANSITION METAL DICHALCOGENIDES

(71) Applicant: City University of Hong Kong, Hong Kong (HK)

(72) Inventors: Hua Zhang, Hong Kong (HK); Zhuangchai Lai, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 586 days.

(21) Appl. No.: 18/072,721

(22) Filed: Dec. 1, 2022

(65) Prior Publication Data
US 2023/0227323 A1   Jul. 20, 2023

Related U.S. Application Data

(60) Provisional application No. 63/300,055, filed on Jan. 17, 2022.

(51) Int. Cl.
*C01G 1/12* (2006.01)
*C01G 47/00* (2006.01)

(52) U.S. Cl.
CPC ............. *C01G 1/12* (2013.01); *C01G 47/00* (2013.01); *C01P 2006/33* (2013.01)

(58) Field of Classification Search
None
See application file for complete search history.

(56) References Cited

U.S. PATENT DOCUMENTS
2020/0291540 A1 * 9/2020 Joo .................... D01F 1/10

FOREIGN PATENT DOCUMENTS
WO   WO-2018231153 A1 * 12/2018   ............. C30B 25/00

OTHER PUBLICATIONS

B. Ravel, M. Newville, Athena, Artemis, Hephaestus: data analysis for X-ray absorption spectroscopy using IFEFFIT, J. Synchrotron Rad. 2005, 12, 537-541.
(Continued)

*Primary Examiner* — Anthony J Zimmer
*Assistant Examiner* — Zachary John Baum
(74) *Attorney, Agent, or Firm* — Idea Intellectual Limited; Sam T. Yip

(57) ABSTRACT

A one-step salt-assisted general synthetic methodology for the controlled phase transformation of various types of 2H-phase transition metal dichalcogenides (2H-TMDs), yielding large-scale metastable 1T'-phase transition metal dichalcogenides (1T'-TMDs), including $WS_2$, $WSe_2$, $MoS_2$, and $MoSe_2$ is described. By tuning the reaction conditions, alloyed 1T'-TMDs such as $WS_{2x}Se_{2(1-x)}$ and $MoS_{2x}Se_{2(1-x)}$ are also obtained. Commercially-available metal salts such as $K_2C_2O_4 \cdot H_2O$, $Na_2C_2O_4$, $K_2CO_3$, $Na_2CO_3$, $Cs_2CO_3$, $Rb_2CO_3$, $KHCO_3$, and $NaHCO_3$, are demonstrated to be effective for the controlled phase transformation at elevated temperatures in a reducing atmosphere. The technique may be extended to the phase engineering of other materials with various polymorphs.

10 Claims, 24 Drawing Sheets

(56) References Cited

OTHER PUBLICATIONS

Y. Chen, Z. Lai, X. Zhang, Z. Fan, Q. He, C. Tan, H. Zhang, Phase engineering of nanomaterials, Nat. Rev. Chem. 2020, 4, 243.
C. Tan, X. Cao, X.-J. Wu, Q. He, J. Yang, X. Zhang, J. Chen, W. Zhao, S. Han, G.-H. Nam, M. Sindoro, H. Zhang, Recent Advances in Ultrathin Two-Dimensional Nanomaterials, Chem. Rev. 2017, 117, 6225-6331.
X. Zhang, Z. Lai, Q. Ma, H. Zhang, Novel structured transition metal dichalcogenide nanosheets, Chem. Soc. Rev. 2018, 47, 3301-3331.
X. Yin, C. S. Tang, Y. Zheng, J. Gao, J. Wu, H. Zhang, M. Chhowalla, W. Chen, A. T. S. Wee, Recent developments in 2D transition metal dichalcogenides: phase transition and applications of the (quasi-)metallic phases, Chem. Soc. Rev. 2021, 50, 10087-10115.
D. Voiry, A. Mohite, M. Chhowalla, Phase engineering of transition metal dichalcogenidesChem . Soc. Rev. 2015, 44, 2702-2712.
M. S. Sokolikova, C. Mattevi, Direct synthesis of metastable phases of 2D transition metal dichalcogenides, Chem. Soc. Rev. 2020, 49, 3952-3980.
R. Kappera, D. Voiry, S. E. Yalcin, B. Branch, G. Gupta, A. D. Mohite, M. Chhowalla, Phase-engineered low-resistance contacts for ultrathin $MoS_2$ transistors, Nat. Mater. 2014, 13, 1128-1135.
S. Cho, S. Kim, J. H. Kim, J. Zhao, J. Seok, D. H. Keum, J. Baik, D.-H. Choe, K. J. Chang, K. Suenaga, S. W. Kim, Y. H. Lee, H. Yang, Phase patterning for ohmic homojunction contact in $MoTe_2$, Science 2015, 349, 625-628.
D. Voiry, H. Yamaguchi, J. Li, R. Silva, D. C. B. Alves, T. Fujita, M. Chen, T. Asefa, V. B. Shenoy, G. Eda, M. Chhowalla, Enhanced catalytic activity in strained chemically exfoliated $WS_2$ nanosheets for hydrogen evolution, Nat. Mater. 2013, 12, 850-822.
Y. Yu, G.-H. Nam, Q. He, X.-J. Wu, K. Zhang, Z. Yang, J. Chen, Q. Ma, M. Zhao, Z. Liu, F.-R. Ran, X. Wang, H. Li, X. Huang, B. Li, Q. Xiong, Q. Zhang, Z. Liu, L. Gu, Y. Du, W. Huang, H. Zhang, High phase-purity 1T'-$MoS_2$- and 1T'-$MoSe_2$-layered crystals, Nat. Chem. 2018, 10, 638-643.
S. Manzeli, D. Ovchinnikov, D. Pasquier, O. V. Yazyev, A. Kis, 2D transition metal dichalcogenides, Nat. Rev. Mater. 2017, 2, 17033.
J. Peng, Y. Liu, X. Luo, J. Wu, Y. Lin, Y. Guo, J. Zhao, X. Wu, C. Wu, Y. Xie, High Phase Purity of Large-Sized 1T'-$MoS_2$ Monolayers with 2D Superconductivity, Adv. Mater. 2019, 31, 1900568.
Z. Lai, Q. He, T. H. Tran, D. V. M. Repaka, D.-D. Zhou, Y. Sun, S. Xi, Y. Li, A. Chaturvedi, C. Tan, B. Chen, G.-H. Nam, B. Li, C. Ling, W. Zhai, Z. Shi, D. Hu, V. Sharma, Z. Hu, Y. Chen, Z. Zhang, Y. Yu, X. Renshaw Wang, R. V. amanujan, Y. Ma, K. Hippalgaonkar, H. Zhang, Metastable 1T'-phase group VIB transition metal dichalcogenide crystals, Nat. Mater. 2021, 20, 1113-1122.
L. Liu, J. Wu, L. Wu, M. Ye, X. Liu, Q. Wang, S. Hou, P. Lu, L. Sun, J. Zheng, L. Xing, L. Gu, X. Jiang, L. Xie, L. Jiao, Phase-selective synthesis of 1T' $MoS_2$ monolayers and heterophase bilayers, Nat. Mater. 2018, 17, 1108-1115.
B. Mahler, V. Hoepfner, K. Liao, G. A. Ozin, Colloidal Synthesis of 1T-$WS_2$ and 2H—$WS_2$ Nanosheets: Applications for Photocatalytic Hydrogen Evolution, J. Am. Chem. Soc. 2014, 136, 14121-14127.
X. Geng, W. Sun, W. Wu, B. Chen, A. Al-Hilo, M. Benamara, H. Zhu, F. Watanabe, J. Cui, T.-P. Chen, Pure and stable metallic phase molybdenum disulfide nanosheets for hydrogen evolution reaction, Nat. Commun. 2016, 7, 10672.
M. S. Sokolikova, P. C. Sherrell, P. Palczynski, V. L. Bemmer, C. Mattevi, Direct solution-phase synthesis of 1T' $WSe_2$ nanosheets, Nat. Commun. 2019, 10, 712.
Z.-H. Chi, X.-M. Zhao, H. Zhang, A. F. Goncharov, S. S. Lobanov, T. Kagayama, M. Sakata, X.-J. Chen, Pressure-Induced Metallization of Molybdenum Disulfide, Phys. Rev. Lett. 2014, 113, 036802.
Y. Qi, P. G. Naumov, M. N. Ali, C. R. Rajamathi, W. Schnelle, O. Barkalov, M. Hanfland, S.-C. Wu, C. Shekhar, Y. Sun, X. Süß, M. Schmidt, U. Schwarz, E. Pippel, P. Werner, R. Hillebrand, T. Förster, E. Kampert, S. Parkin, R. J. Cava, C. Felser, B. Yan, S. A. Medvedev, Superconductivity in Weyl semimetal candidate $MoTe_2$, Nat. Commun. 2016, 7, 11038.
D. Voiry, M. Salehi, R. Silva, T. Fujita, M. Chen, T. Asefa, V. B. Shenoy, G. Eda, M. Chhowalla, Conducting $MoS_2$ Nanosheets as Catalysts for Hydrogen Evolution Reaction, Nano Lett. 2013, 13, 6222-6227.
M. Acerce, D. Voiry, M. Chhowalla, Metallic 1T phase $MoS_2$ nanosheets as supercapacitor electrode materials, Nat. Nanotechnol. 2015, 10, 313-318.
Z. Zeng, Z. Yin, X. Huang, H. Li, Q. He, G. Lu, F. Boey, H. Zhang, Single-Layer Semiconducting Nanosheets: High-Yield Preparation and Device Fabrication, Angew. Chem., Int. Ed. 2011, 50, 11093-11095.
A. Chaturvedi, B. Chen, K. Zhang, Q. He, G. H. Nam, L. You, Z. Lai, C. Tan, T. H. Tran, G. Liu, J. Zhou, Z. Liu, J. Wang, E. H. T. Teo, H. Zhang, A universal method for rapid and large-scale growth of layered crystals, SmartMat 2020, 1, e1011.
Y. Sun, K. Fujisawa, Z. Lin, Y. Lei, J. S. Mondschein, M. Terrones, R. E. Schaak, Low-Temperature Solution Synthesis of Transition Metal Dichalcogenide Alloys with Tunable Optical Properties, J. Am. Chem. Soc. 2017, 139, 11096-11105.
M. Zhang, J. Wu, Y. Zhu, D. O. Dumcenco, J. Hong, N. Mao, S. Deng, Y. Chen, Y. Yang, C. Jin, S. H. Chaki, Y.-S. Huang, J. Zhang, L. Xie, Two-Dimensional Molybdenum Tungsten Diselenide Alloys: Photoluminescence, Raman Scattering, and Electrical TransportACS Nano 2014, 8, 7130-7137.
Zhou, J. et al. A library of atomically thin metal chalcogenides. Nature 556, 355-359 (2018).
Sung, J. H. et al. Coplanar semiconductor-metal circuitry defined on few-layer $MoTe_2$ via polymorphic heteroepitaxy. Nat. Nanotechnol. 12, 1064 (2017).
Wang, Y. et al. Structural phase transition in monolayer $MoTe_2$ driven by electrostatic doping. Nature 550, 487-491 (2017).
Gao, X., Xiong, L., Wu, J., Wan, J. & Huang, L. Scalable and controllable synthesis of 2D high-proportion 1T-phase $MoS_2$. Nano Res. 13, 2933-2938 (2020).

* cited by examiner

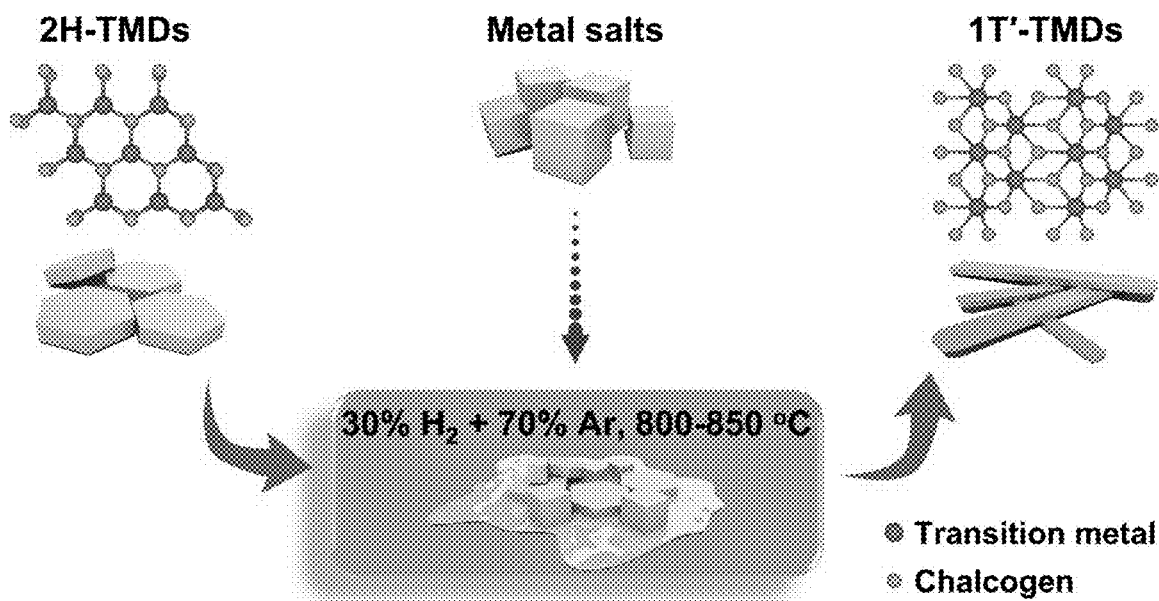

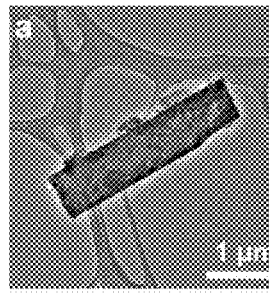
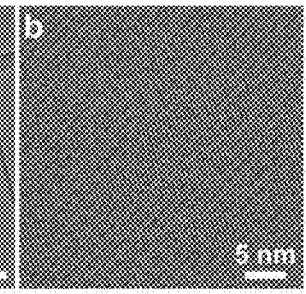
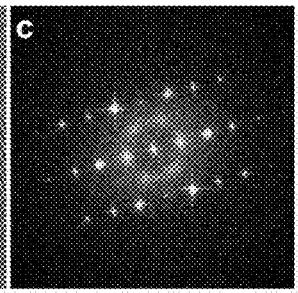
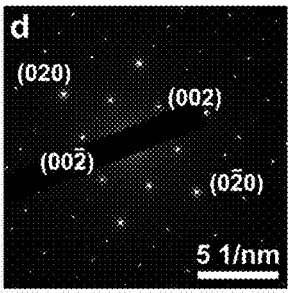
FIG. 3A　　　FIG. 3B　　　FIG. 3C　　　FIG. 3D
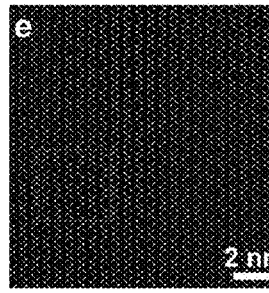
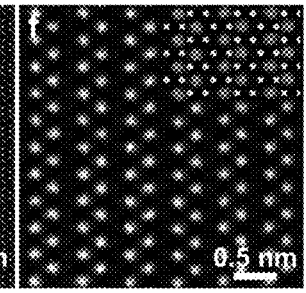
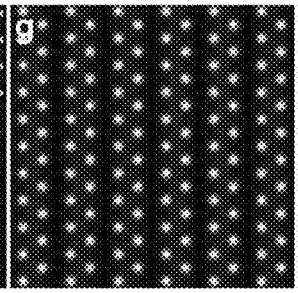
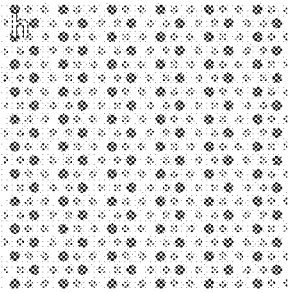
FIG. 3E　　　FIG. 3F　　　FIG. 3G　　　FIG. 3H
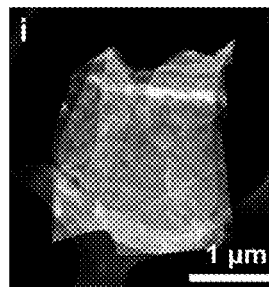
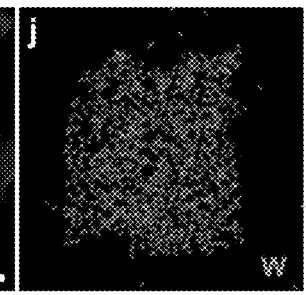
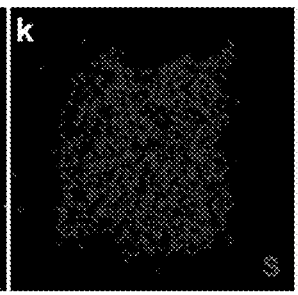
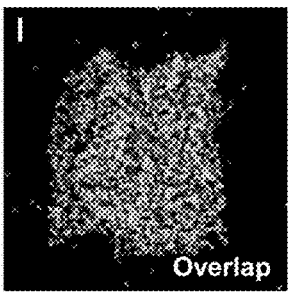
FIG. 3I　　　FIG. 3J　　　FIG. 3K　　　FIG. 3L

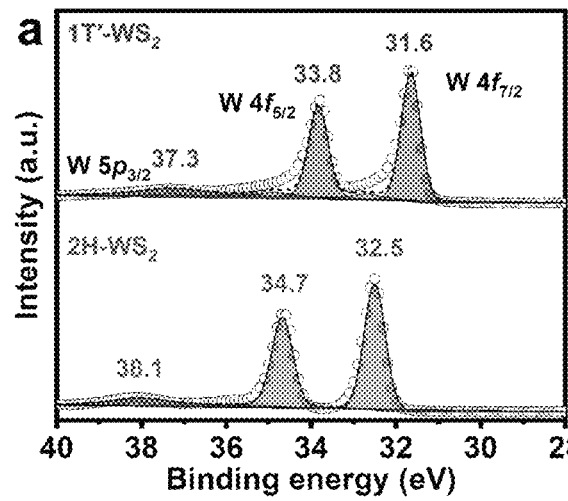
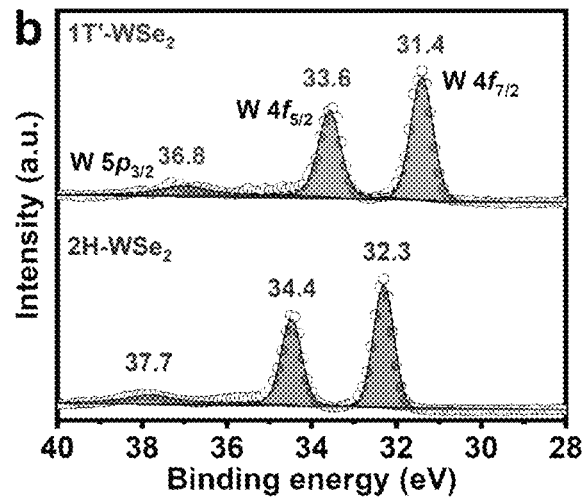
FIG. 5A  FIG. 5B
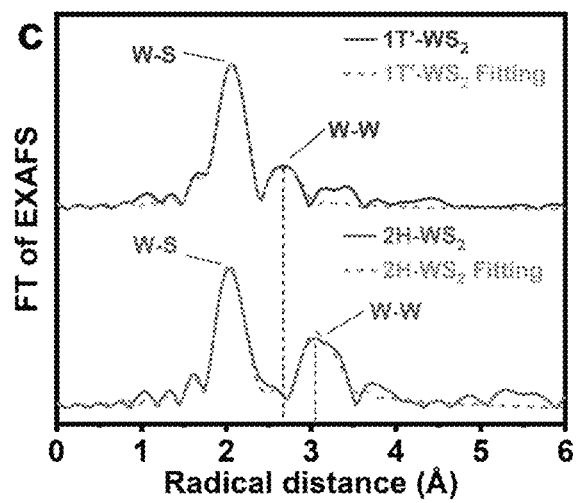
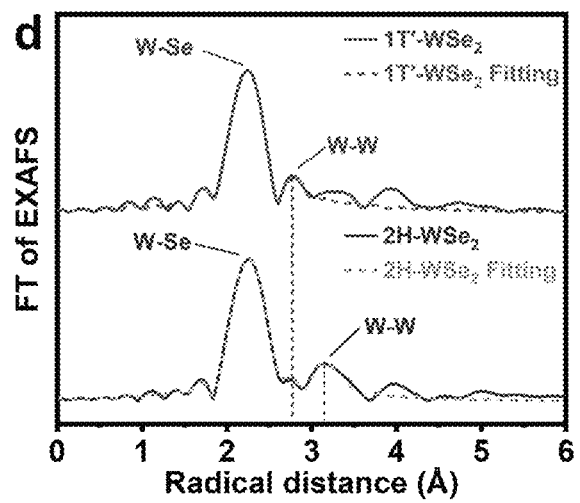
FIG. 5C  FIG. 5D

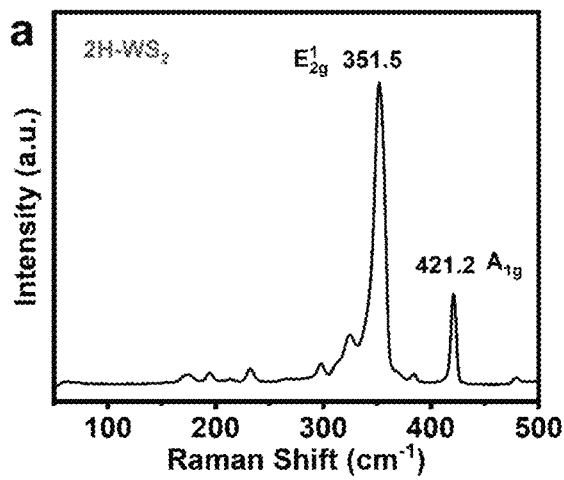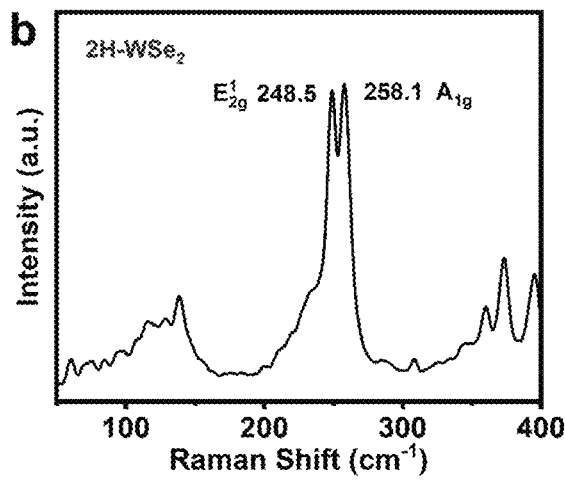
FIG. 10A　　　　　　　　　　FIG. 10B
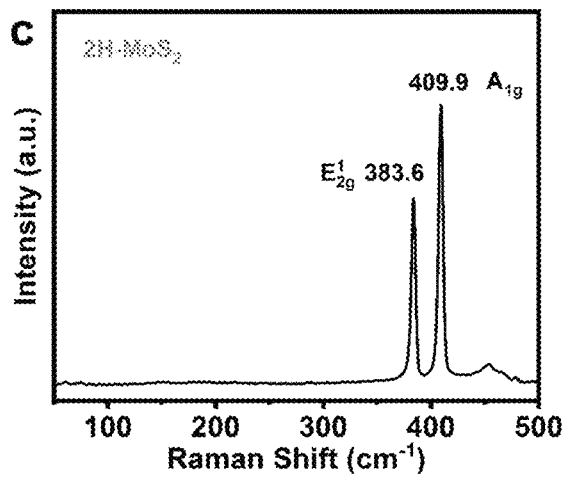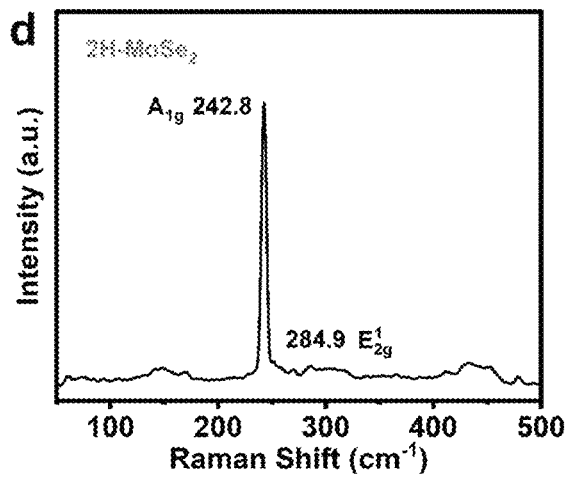
FIG. 10C　　　　　　　　　　FIG. 10D

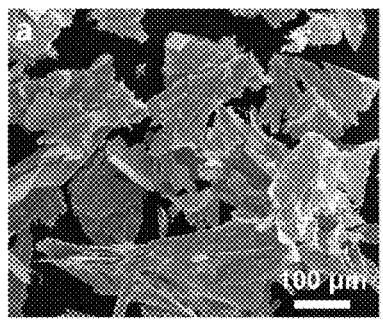 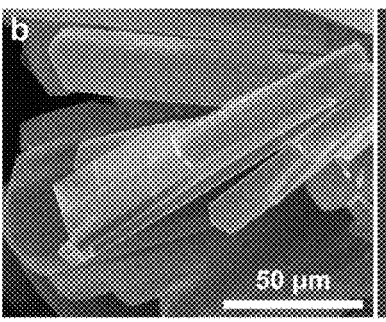 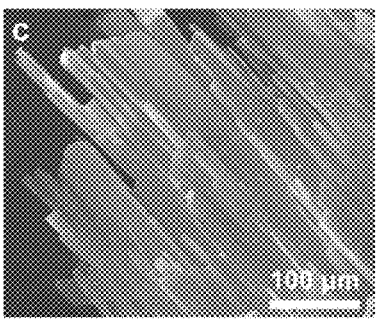
FIG. 23A  FIG. 23B  FIG. 23C
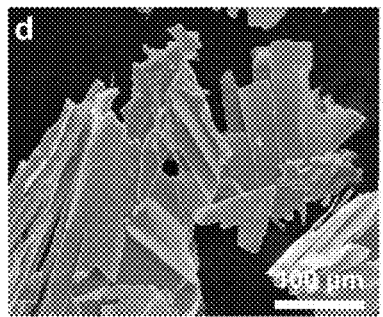 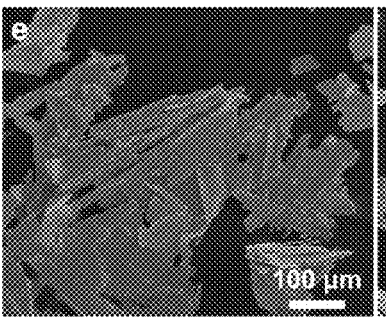 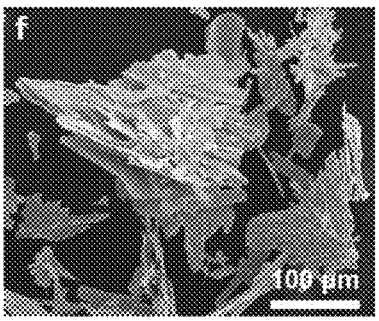
FIG. 23D  FIG. 23E  FIG. 23F

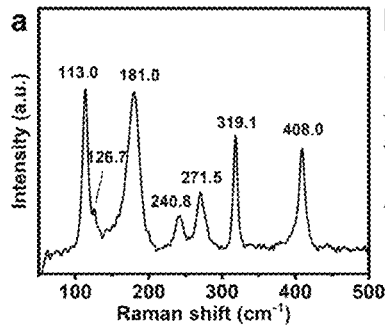 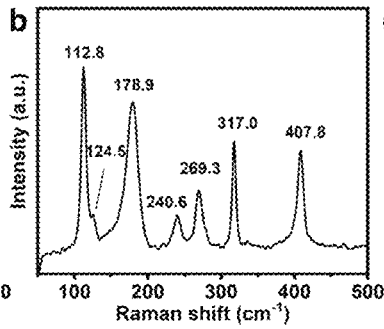 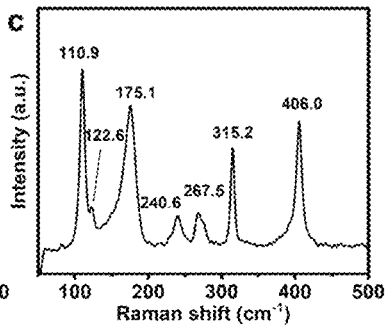
FIG. 24A  FIG. 24B  FIG. 24C
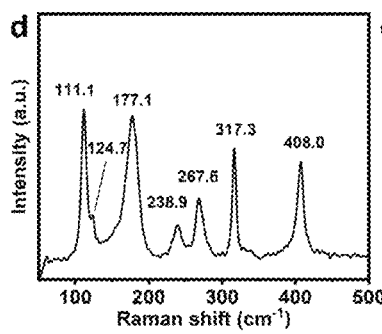 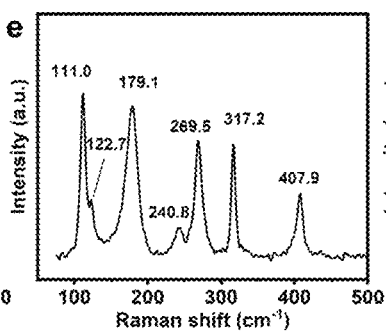 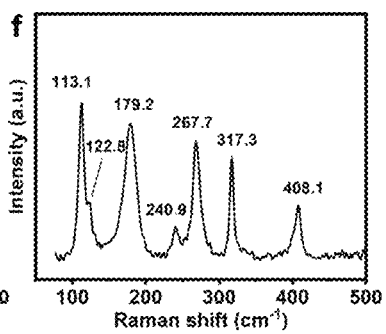
FIG. 24D  FIG. 24E  FIG. 24F

SALT-ASSISTED PHASE TRANSFORMATION OF TRANSITION METAL DICHALCOGENIDES

CROSS-REFERENCE WITH OTHER APPLICATIONS

The present application claims priority to the U.S. Provisional Patent Application No. 63/300,055 filed 17 Jan. 2022; the disclosure of which is incorporated herein by reference in its entirety.

FIELD OF THE INVENTION

The present invention provides a general and effective strategy for controlled phase transformation of transition metal dichalcogenides (TMDs) and, more particularly, for the transformation of thermodynamically stable phases into metastable phases of transition metal dichalcogenides (TMDs).

BACKGROUND

Layered two-dimensional (2D) transition metal dichalcogenides (TMDs) have attracted increasing research interest due to their unique physicochemical properties, as well as wide applications in fields such as electronics, catalysis, energy conversion and storage, sensing, biomedicine, and condensed matter physics. As one of the most important structural features, crystal phase plays an important role in determining the intrinsic properties of TMDs, and thus their various applications. For example, TMDs with unconventional metastable phases (e.g., 1T, 1T' and $1T_d$) exhibit greater potential for electronics, catalysis, and condensed-matter physics, compared to their counterparts with conventional thermodynamically-stable phases (e.g., 2H and 3R).

Although efforts have been devoted to preparing unconventional-phase TMDs, it is still challenging to prepare high-quality and high-purity TMDs with unconventional metastable phases such as 1T and 1T' phases in a controlled manner Although some metastable phase TMDs have been synthesized by the direct synthesis methods including gas-solid reactions, chemical vapor deposition (CVD), and solution-based methods, these methods suffer from complex synthesis, low yields, and impure products (e.g., mixed with 2H phase or oxide impurities); as such, these techniques are not practical for large-scale production of highly-pure metastable phase TMDs. Consequently, phase transformation of conventional-phase TMDs is potentially an effective approach for the preparation of unconventional-phase TMDs. For instance, laser irradiation, ultrahigh pressure, and alkali ion-assisted electrochemical/chemical intercalation methods have been used to prepare unconventional-phase TMDs by using 2H-TMDs as starting materials. Unfortunately, most of these methods require either harsh conditions (e.g., ultrahigh pressure) or destructive treatment (e.g., laser irradiation); these result in unexpected defects or damage to the TMDs during the phase transformation process, making them unsuitable for large-scale production of high-quality metastable-phase TMDs.

Hence, there is a need in the art for the development of a general and effective strategy for controlled phase transformation of TMDs; such a technique could be used for the transformation of thermodynamically stable phases into metastable phases, particularly in large quantities.

SUMMARY OF THE INVENTION

The present invention provides a simple, effective, and universal one-step approach for the controlled transformation of TMDs from their thermodynamically stable 2H phase to the metastable 1T' phase. Commercially available 2H-TMDs, such as $WS_2$, $WSe_2$, $MoS_2$ and $MoSe_2$, can be readily transformed into the corresponding 1T'-TMDs with the assistance of various types of metal salts, such as $K_2C_2O_4 \cdot H_2O$, $K_2CO_3$, $Na_2CO_3$, $Rb_2CO_3$, $Cs_2CO_3$, $KHCO_3$, $NaHCO_3$ and $Na_2C_2O_4$. Moreover, this method can also be used to prepare 1T'-TMD alloys, such as $1T'-WS_{2x}Se_{2(1-x)}$. The as-prepared 1T'-TMD crystals with high phase purity have been investigated and verified by aberration-corrected high-angle annular dark-field (HAADF), scanning transmission electron microscope (STEM), selected area electron diffraction (SAED), X-ray photoelectron spectroscopy (XPS), Raman spectroscopy, X-ray diffraction (XRD), X-ray absorption near edge structure (XANES), and extended X-ray absorption fine structure (EXAFS).

In one aspect, the present invention provides a method for phase transformation of transition metal dichalcogenides from a stable phase to a metastable phase. The method includes reacting a 2H or 3R phase transition metal dichalcogenide with an alkali metal salt at a temperature of 700-1000° C. in reducing atmosphere, which is transformed to a 1T or 1T' metastable phase.

In a further aspect, the transition metal dichalcogenide is one or more of $WS_2$, $WSe_2$, $MoS_2$, $MoSe_2$, $WS_{2x}Se_{2(1-x)}$, $MoS_{2x}Se_{2(1-x)}$, $TaS_2$, $TaSe_2$, $TiS_2$, $TiSe_2$, $ReS_2$, $ReSe_2$, $NbS_2$, and $NbSe_2$.

In a further aspect, the metal salt is selected from one or more of $K_2C_2O_4 \cdot H_2O$, $Na_2C_2O_4$, $K_2CO_3$, $Na_2CO_3$, $Cs_2CO_3$, $Rb_2CO_3$, $KHCO_3$, and $NaHCO_3$.

In a further aspect, the reducing atmosphere includes hydrogen.

In a further aspect, the method includes recovering the 1T or 1T' metastable phase of the transition metal dichalcogenide from the reaction product by washing with water and an $I_2$ acetonitrile solution.

In a further aspect, a ratio of the transition metal dichalcogenide to the alkali metal salt is approximately 1:1 to approximately 1:2.

In a further aspect an additional amount of the chalcogen component of the selected transition metal dichalcogenide is added to the mixture.

In a further aspect the additional amount of the chalcogen component is added in a ratio of approximately 1:4 to approximately 1:12 where the ratio is the selected transition metal dichalcogenide to the chalcogen.

In a further aspect, the heating is from approximately 3 hours to approximately 8 hours.

In a further aspect, the temperature is approximately 800-850° C.

BRIEF DESCRIPTION OF THE DRAWINGS

FIG. 1 is a schematic illustration of the general strategy for the phase transformation of TMDs ($WS_2$, $WSe_2$, $MoS_2$ and $MoSe_2$) from 2H to 1T' phases assisted by various types of salts, such as $K_2C_2O_4 \cdot H_2O$, $K_2CO_3$, $Na_2CO_3$, $Rb_2CO_3$, $Cs_2CO_3$, $KHCO_3$, $NaHCO_3$, and $Na_2C_2O_4$.

FIGS. 3A-3L: Structure characterization of 1T'-WS$_2$ crystals transformed from 2H-WS$_2$ powders with the assistance of K$_2$C$_2$O$_4$·H$_2$O. (3A-3B) Low-magnification (3A) and high-resolution (3B) TEM images of a 1T'-WS$_2$ crystal transformed from 2H-WS$_2$. (3C) Corresponding fast Fourier transform (FFT) pattern of the TEM image in (3B). (3D) SAED pattern of a 1T'-WS$_2$ single crystal transformed from 2H-WS$_2$. (3E) HAADF-STEM image obtained from a mechanically exfoliated single-layered 1T'-WS$_2$. (3F) Enlarged HAADF-STEM image in the marked area in (3E). Inset: the simulated atomic arrangement model of 1T'-WS$_2$. Yellow and grey balls represent the S and W atoms, respectively. (3G-3H) Simulated STEM image (3G) and the corresponding atomic structure model (3H) of the single-layer 1T'-WS$_2$ in (3F). Yellow and grey balls represent the S and W atoms, respectively. (3I) Dark-field STEM image of 1T'-WS$_2$ nanosheets. (3J-3L) Elemental mapping images of the 1T'-WS$_2$ nanosheets in (3I): W L signals (3J), S K signals (3K), and the overlap of W L and S K signals (3L).

FIGS. 5A-5D show the structural characterization of 1T'-WS$_2$ and 1T'-WSe$_2$ transformed from 2H-WS$_2$ and 2H-WSe$_2$ powders, respectively, with the assistance of K$_2$C$_2$O$_4$·H$_2$O. (5A) Experimental (open circles) and fitted (dashed curve) high-resolution XPS W 4f spectra of 1T'-WS$_2$ (top) and 2H-WS$_2$ (bottom). (5B) Experimental (open circles) and fitted (dashed curve) high-resolution XPS W 4f spectra of 1T'-WSe$_2$ (top) and 2H-WSe$_2$ (bottom). (5C) Experimental data (solid curves) and fitting results (dashed curves) of Fourier transforms of W L$_3$-edge EXAFS spectra of 1T'-WS$_2$ (top) and 2H-WS$_2$ (bottom). (5D) Experimental data (solid curves) and fitting results (dashed curves) of Fourier transforms of W L$_3$-edge EXAFS spectra of 1T'-WSe$_2$ (top) and 2H-WSe$_2$ (bottom).

FIGS. 10A-10D are Raman spectra of the commercially available 2H-TMD powders: (10A) 2H-WS$_2$, (10B) 2H-WSe$_2$, (10C) 2H-MoS$_2$, and (10D) 2H-MoSe$_2$.

FIGS. 23A-23F show SEM images of the 1T'-$WS_2$ crystals transformed from the commercially available 2H-$WS_2$ power with the assistance of different metal salts: (23A) $Na_2CO_3$, (23B) $Rb_2CO_3$, (23C) $Cs_2CO_3$, (23D) $KHCO_3$, (23E) $NaHCO_3$ and (23F) $Na_2C_2O_4$.

FIGS. 24A-24F show Raman spectra of the 1T'-$WS_2$ crystals transformed from the commercially available 2H-$WS_2$ power with the assistance of different metal salts: (24A) $Na_2CO_3$, (24B) $Rb_2CO_3$, (24C) $Cs_2CO_3$, (24D) $KHCO_3$, (24E) $NaHCO_3$ and (24F) $Na_2C_2O_4$.

DETAILED DESCRIPTION

Figures 2A, 2B, 2C, 2D:
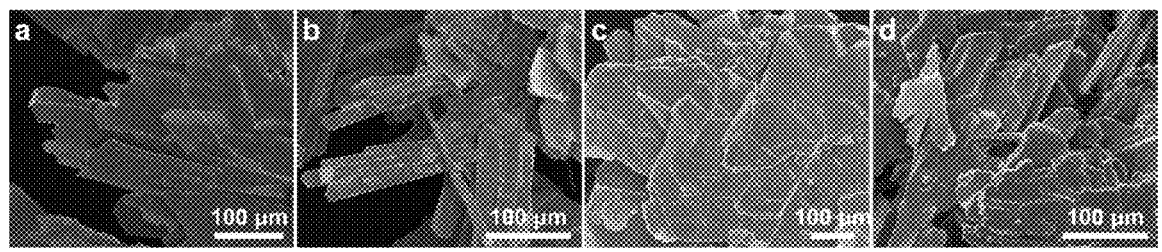
FIGS. 2A-2H Morphology characterization of the 1T'-TMD crystals transformed from the corresponding 2H-TMD powders. (2A-2D) SEM images of $1T'-WS_2$ (2A), $1T'-WSe_2$ (2B), $1T'-MoS_2$ (2C) and $1T'-MoSe_2$ (2D) crystals transformed from their corresponding 2H-phase powders with the assistance of $K_2C_2O_4 \cdot H_2O$. (2E-2H) SEM images of $1T'-WS_2$ (2E), $1T'-WSe_2$ (2F), $1T'-MoS_2$ (2G) and $1T'-MoSe_2$ (2H) crystals transformed from their corresponding 2H-phase powders with the assistance of $K_2CO_3$.

The present invention provides a single-step salt-assisted synthetic methodology for the controlled phase transformation of various types of 2H or 3R transition metal dichalcogenides, yielding large-scale metastable 1T- or 1T'-phase transition metal dichalcogenides (1T- or 1T'-TMDs), including $WS_2$, $WSe_2$, $MoS_2$, and $MoSe_2$.

The transition metal dichalcogenide may be one or more of $WS_2$, $WSe_2$, $MoS_2$, $MoSe_2$, $WS_{2x}Se_{2(1-x)}$ and $MoS_{2x}Se_{2(1-x)}$, $TaS_2$, $TaSe_2$, $TiS_2$, $TiSe_2$, $ReS_2$, $ReSe_2$, $NbS_2$, and $NbSe_2$. The metal salt may be one or more of $K_2C_2O_4 \cdot H_2O$, $Na_2C_2O_4$, $K_2CO_3$, $Na_2CO_3$, $Cs_2CO_3$, $Rb_2C_3$, $KHCO_3$, and $NaHCO_3$.

The procedure for the 2H-to-1T' phase transformation of transition metal dichalcogenides is schematically shown in FIG. 1. In order to prepare highly pure 1T'-TMDs, the corresponding commercially available 2H-TMDs are mixed with a certain amount of a selected metal salt, such as $K_2C_2O_4 \cdot H_2O$, $K_2CO_3$, $Na_2CO_3$, $Rb_2C_3$, $Cs_2CO_3$, $KHCO_3$, $NaHCO_3$ or $Na_2C_2O_4$, and then ground together, for example, in an agate mortar. Typically, a ratio of a transition metal dichalcogenide to metal salt is from a range of approximately 1:1 to 1:2. An additional amount of the chalcogen component is included, in a range from approximately 1:4 (transition metal dichalcogenide:chalcogen) to 1:12. Particular embodiments are shown in the Examples, below.

The obtained ground mixture is heated, particularly in a reducing atmosphere, at a temperature from approximately 700° C. to approximately 1000° C. A reducing atmosphere may be created through the combination of a hydrogen gas and another, relatively inert, gas. For example, hydrogen gas in amount of 20 to 40 percent, such as 30 percent, with a balance of argon, for duration of 3-8 hours, in particular, at 800-850° C. for 4 h.

When certain transition metal dichalcogenides are used as starting materials for the phase transformation, such as 2H-$MoS_2$ (or 2H-$WS_2$), $K_xMoS_2$ (or $K_xWS_2$) as an intermediate product is first formed, which is then washed, for example, with water and an $I_2$ acetonitrile solution, to obtain 1T'-$MoS_2$ (or 1T'-$WS_2$) crystals. However, when other starting transition metal dichalcogenides such as 2H-$MoSe_2$ (or 2H-$WSe_2$) are used for the phase transformation, 1T'-$MoSe_2$ (or 1T'-$WSe_2$) crystals may be directly obtained.

Scanning electron microscopy (SEM) was used to investigate the morphology of the as-prepared 1T'-TMD crystals transformed from the 2H-TMDs. As shown in FIGS. 2A-D, the 1T'-$WS_2$, 1T'-$WSe_2$, 1T'-$MoS_2$ and 1T'-$MoSe_2$ crystals obtained with the assistance of $K_2C_2O_4 \cdot H_2O$ clearly reveal their rectangular plate-like morphology with their sizes up to a few hundred micrometers, which are similar to our previous result, but completely different from the conventional 2H-TMDs (Figure S1). Similarly, the 1T'-$WS_2$, 1T'-$WSe_2$, 1T'-$MoS_2$ and 1T'-$MoSe_2$ crystals obtained assisted by $K_2CO_3$ also exhibit similar morphology characteristics (FIGS. 2E-2H). The chemical compositions of the obtained 1T'-$WS_2$, 1T'-$WSe_2$, 1T'-$MoS_2$ and 1T'-$MoSe_2$ crystals in FIGS. 2A-2D were confirmed by energy-dispersive X-ray spectroscopy (EDS) under an SEM mode, showing strong signals of W/Mo and S/Se elements with the transition metal/chalcogen atomic ratios of ~1:2 (FIGS. 7A-7D), consistent with the stoichiometries of $WS_2$, $WSe_2$, $MoS_2$ and $MoSe_2$.

To reveal the structure and phase purity of the transformed crystals, powder XRD was performed on the 1T'-$WS_2$, 1T'-$WSe_2$, 1T'-$MoS_2$ and 1T'-$MoSe_2$ crystals prepared using $K_2C_2O_4 \cdot H_2O$ (FIGS. 2A-2D). As shown in FIGS. 8A-8D, the obtained experimental XRD results match the simulated XRD patterns very well, not only confirming the 1T' phase, but also revealing the high quality and high phase purity of the as-formed $WS_2$, $WSe_2$, $MoS_2$ and $MoSe_2$ crystals. In addition, due to their different structures, 1T' and 2H phases exhibit different Raman active modes. As shown in FIGS. 9A-9H, the Raman spectra measured on the as-formed 1T'-$WS_2$, 1T'-$WSe_2$, 1T'-$MoS_2$ and 1T'-$MoSe_2$ crystals show characteristic Raman active modes originating from the 1T'-phase structures. There is absence of $E_{2g}^2$ and $A_{1g}$ Raman active modes of 2H-TMDs (FIGS. 10A-10D) in their Raman spectra (FIGS. 9A-9H), further proving the high phase purity of the as-prepared 1T'-TMDs.

Figures 2E, 2F, 2G, 2H:
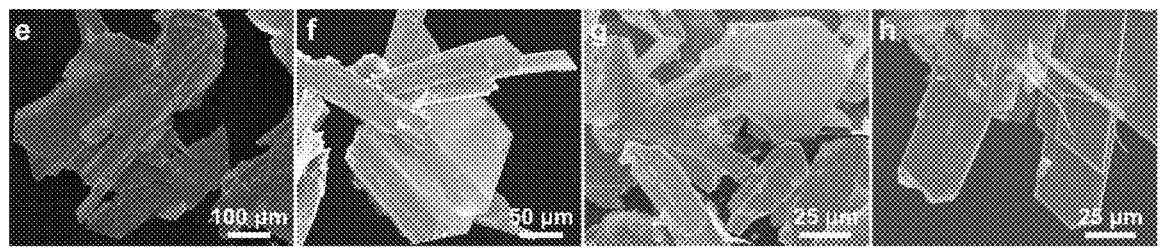
Figure 11A:
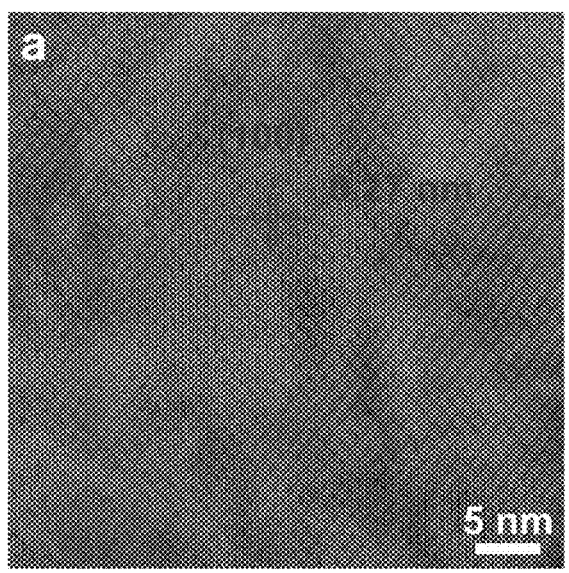
FIGS. 11A-11B are characterization of 2H-WS$_2$. (11A) HRTEM image of the commercially available 2H-WS$_2$. (11B) The corresponding FFT pattern of HRTEM image in (11A), showing the characteristic hexagonal structure.
Figure 11B:
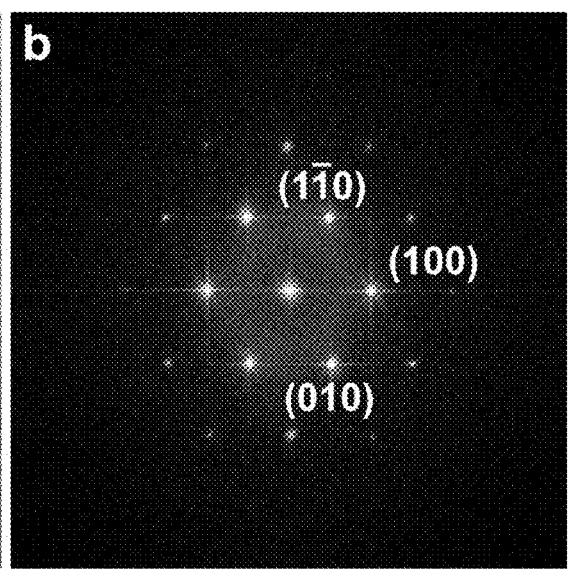

Transmission electron microscope (TEM) was used to confirm the crystal structures of the as-prepared 1T'-TMDs, such as 1T'-$WS_2$ and 1T'-$WSe_2$. As shown in the TEM image (FIG. 3A), the observed 1T'-$WS_2$ crystal exhibits rectangular plate-like structure, which is consistent with the morphology shown in SEM images (FIGS. 2A, 2E). The zigzag chains formed by two lines of W atoms can be clearly observed from the high-resolution TEM (HRTEM) image (FIG. 3B), which are the unique structural feature of the 1T' phase. In contrast, 2H-$WS_2$ shows a symmetrical hexagonal structure, in which the lattice fringe of 0.27 nm indicates the (100) plane of 2H phase (FIG. 11A). In addition, the fast Fourier transform (FFT) pattern (FIG. 3C), which is different from that of 2H-$WS_2$ (FIG. 11B), and the SAED pattern (FIG. 3D) also show the characteristic 1T' structure diffractions.

Figure 12:
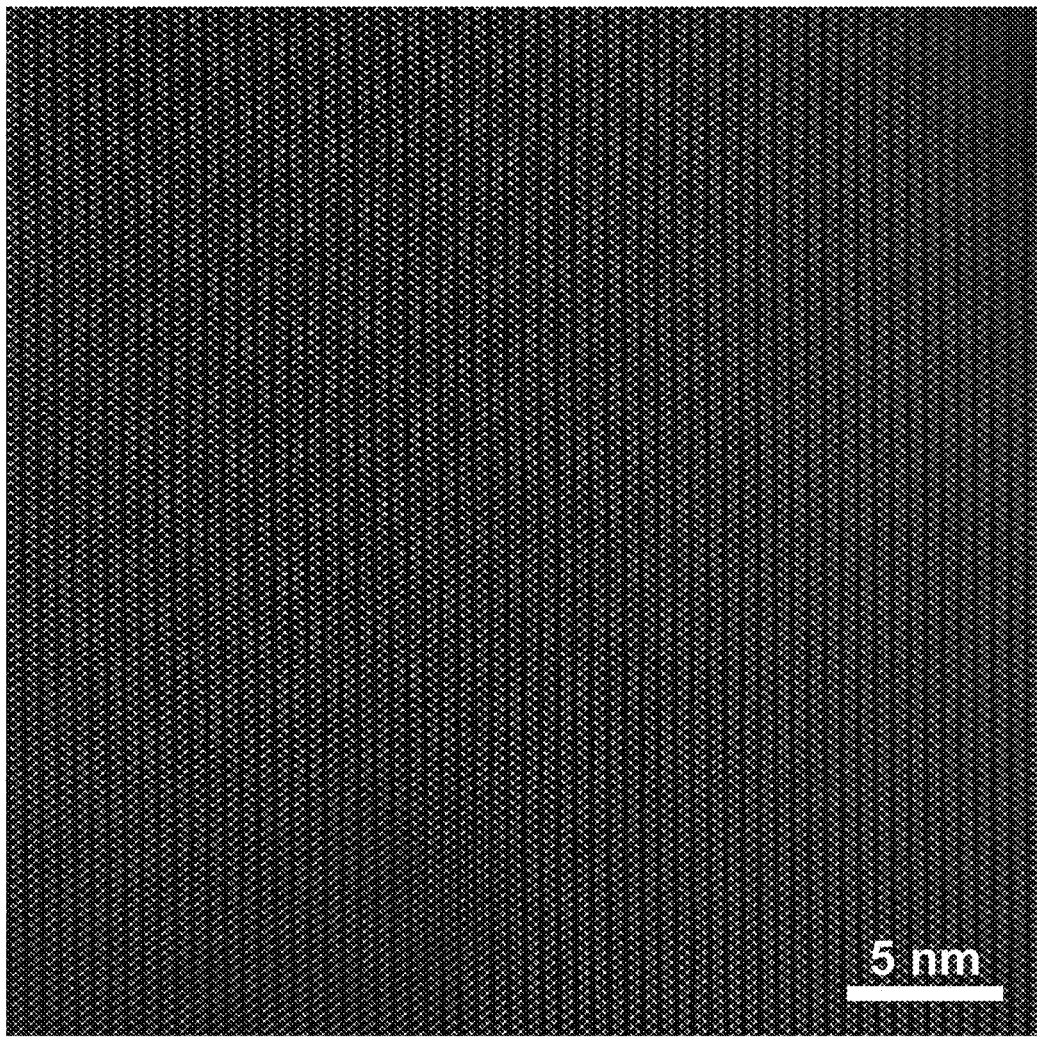
FIG. 12 is a large-area HAADF-STEM image of a mechanically exfoliated single-layered 1T'-WS$_2$ nanosheet.

To further reveal the structure of as-prepared 1T'-$WS_2$, high-resolution HAADF-STEM was carried out to image the mechanically exfoliated single-layer 1T'-$WS_2$ nanosheets. The STEM images clearly show the characteristic atomic arrangement of 1T' phase structure, in which the repeated one-dimensional zigzag chains of W atoms can be observed (FIGS. 3E-3F and FIG. 12). These results are consistent with the simulated STEM image (FIG. 3G) and the corresponding atomic structure model (FIG. 3H), further confirming the successful transformation of 2H-$WS_2$ to 1T'-$WS_2$. Besides, the STEM and elemental mapping images show the signals of W and S uniformly distributed in the 1T'-$WS_2$ nanosheets (FIGS. 3I-3L).

Figures 4A, 4B, 4C, 4D:
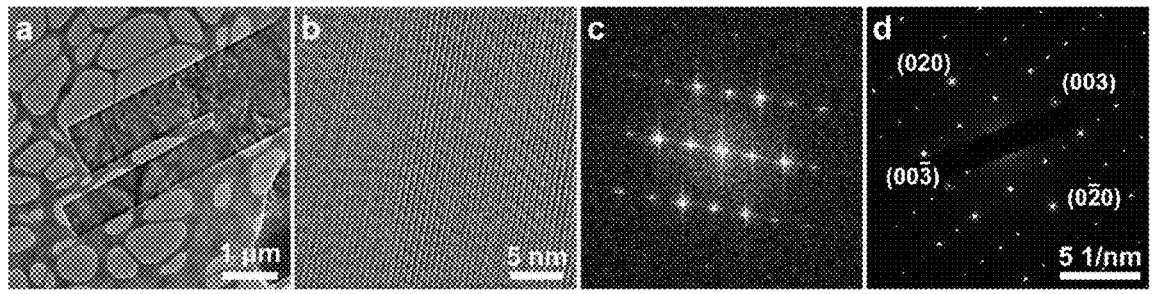
FIGS. 4A-4L show the structure characterization of 1T'-WSe$_2$ crystals transformed from 2H-WSe$_2$ powders with the assistance of K$_2$C$_2$O$_4$·H$_2$O. (4A-4B) Low-magnification (4A) and high-resolution (4B) TEM images of a 1T'-WSe$_2$ crystal transformed from 2H-WSe$_2$. (4C) Corresponding fast Fourier transform (FFT) pattern of the TEM image in (4B). (4D) SAED pattern of a 1T'-WSe$_2$ single crystal transformed from 2H-WSe$_2$. (4E) HAADF-STEM image obtained from a mechanically exfoliated double-layered 1T'-WSe$_2$. (4F) Enlarged HAADF-STEM image in the marked area in (4E). Inset: the simulated atomic arrangement model of 1T'-WSe$_2$. Green and grey balls represent the Se and W atoms, respectively. (4G-4H) Simulated STEM image (4G) and the corresponding atomic structure model (4H) of the double-layered 1T'-WSe$_2$ in (4F). Green and grey balls represent the Se and W atoms, respectively. (4I) Dark-field STEM image of 1T'-WSe$_2$ nanosheets. (4J-4L), Elemental mapping images of the 1T'-WSe$_2$ nanosheets in (4I): W L signals (4J), Se K signals (4K) and the overlap of W L and Se K signals (4L).
Figures 4E, 4F, 4G, 4H:
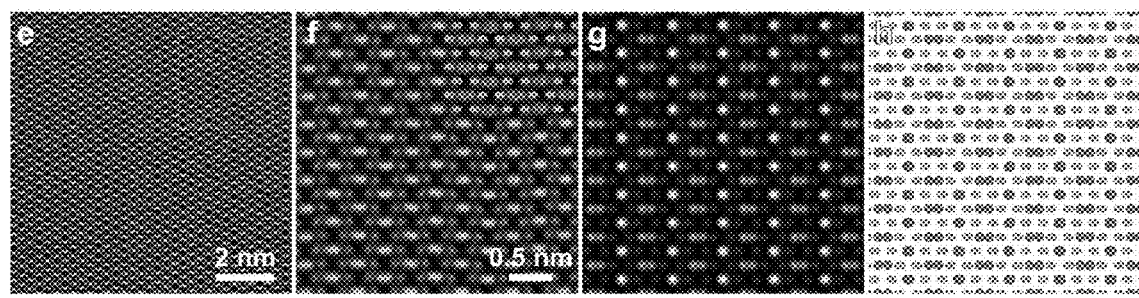
Figures 4I, 4J, 4K, 4L:
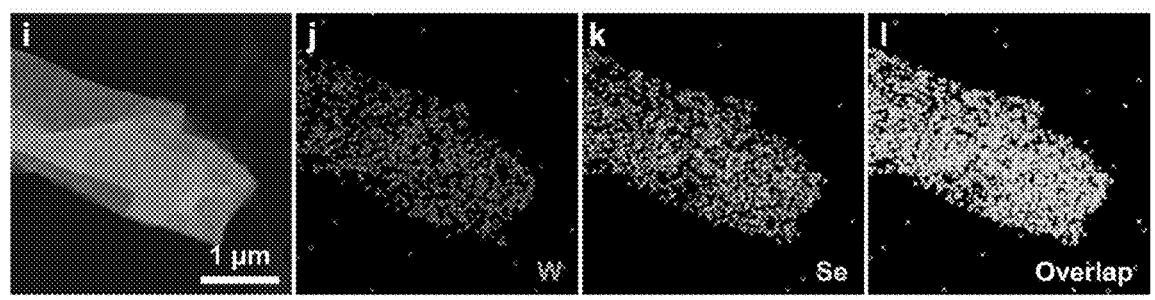
Figure 6A:
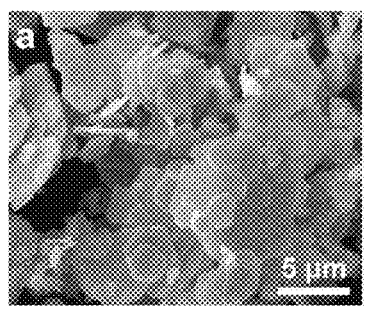
FIGS. 6A-6D are SEM images of the commercially available 2H-TMD powders: (6A) 2H-WS$_2$, (6B) 2H-WSe$_2$, (6C) 2H-MoS$_2$, and (6D) 2H-MoSe$_2$.
Figure 6B:
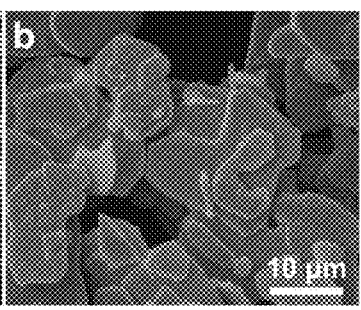
Figure 6C:
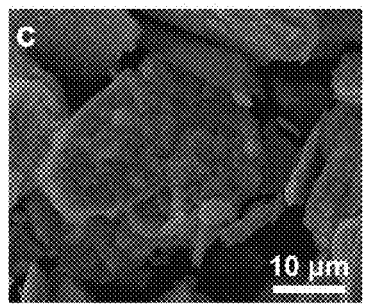
Figure 6D:
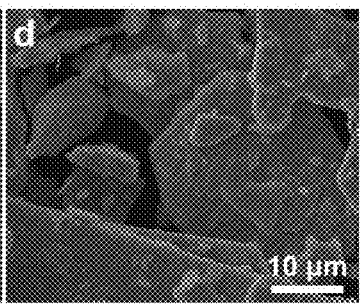
Figure 7A:
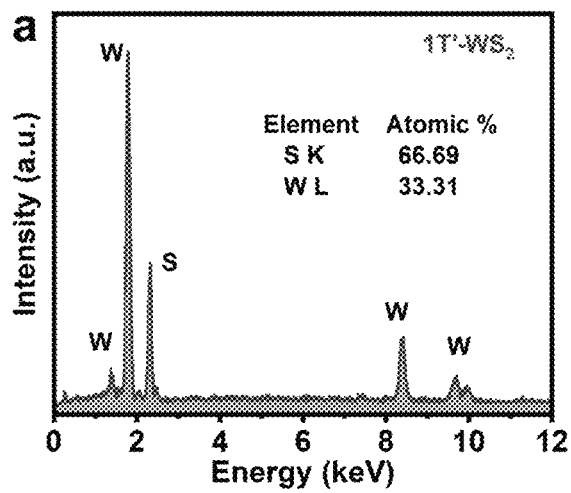
FIGS. 7A-7D are EDS spectra of the 1T'-TMD crystals transformed from the corresponding 2H-TMD powders with the assistance of K$_2$C$_2$O$_4$·H$_2$O: (7A) 1T'-WS$_2$, (7B) 1T'-WSe$_2$, (7C) 1T'-MoS$_2$, and (7D) 1T'-MoSe$_2$.
Figure 7B:
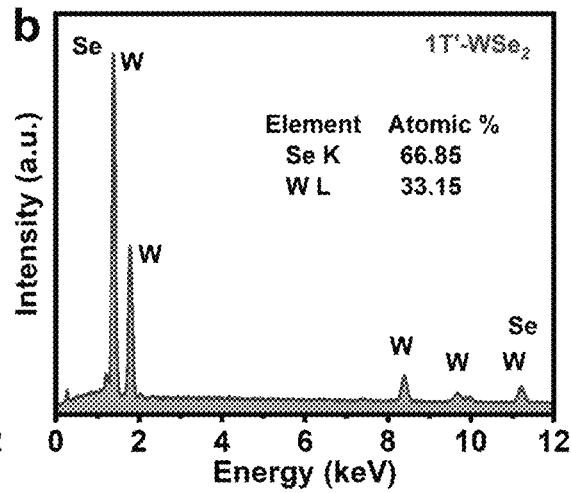
Figure 7C:
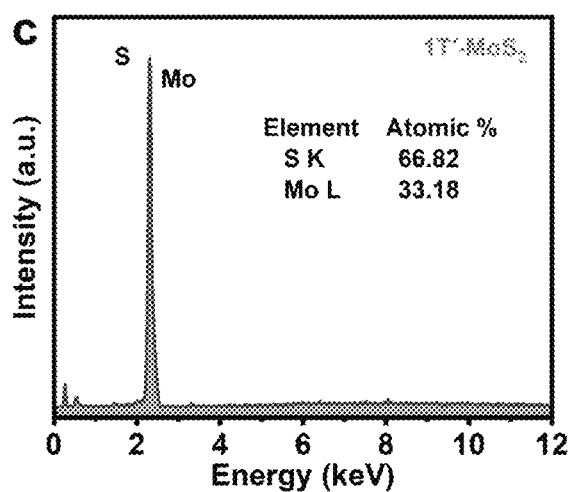
Figure 7D:
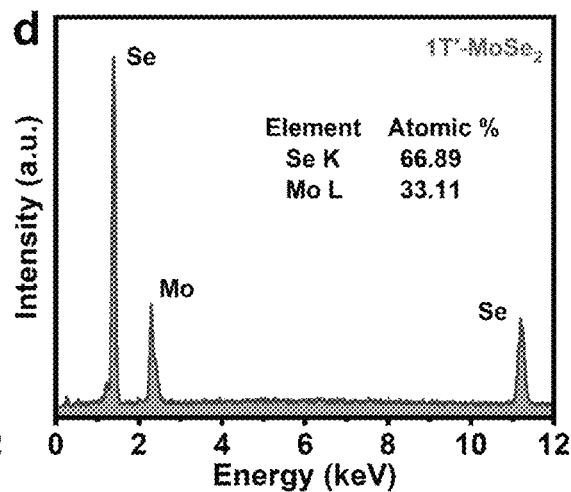
Figure 8A:
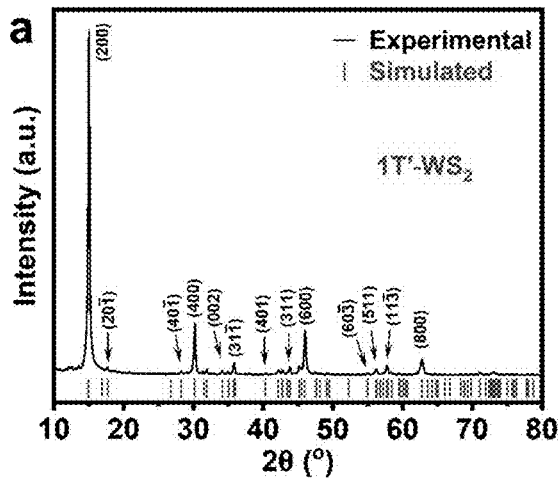
FIGS. 8A-8D are comparisons of experimental and simulated XRD patterns of the 1T'-phase crystals transformed from 2H-phase powders with the assistance of K$_2$C$_2$O$_4$·H$_2$O: (8A) 1T'-WS$_2$, (8B) 1T'-WSe$_2$, (8C) 1T'-MoS$_2$, and (8D) 1T'-MoSe$_2$.
Figure 8B:
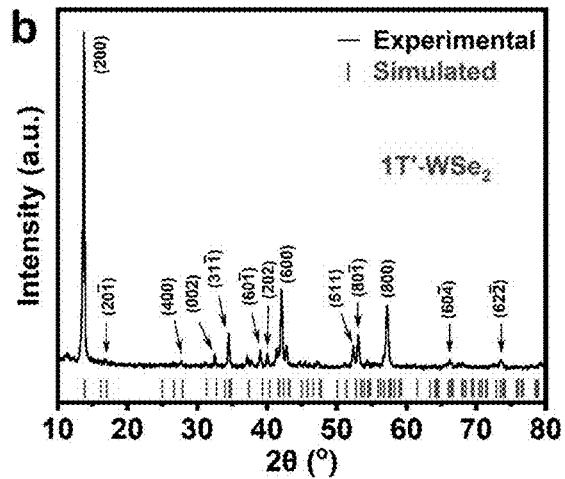
Figure 8C:
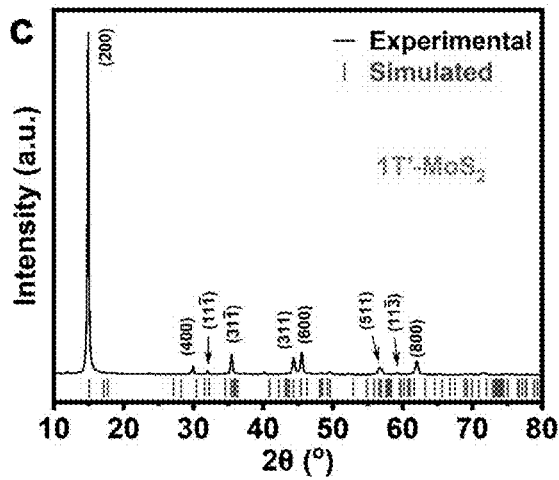
Figure 8D:
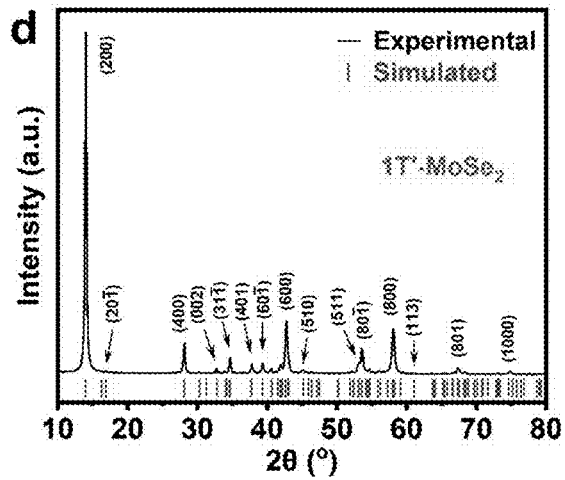
Figure 13A:
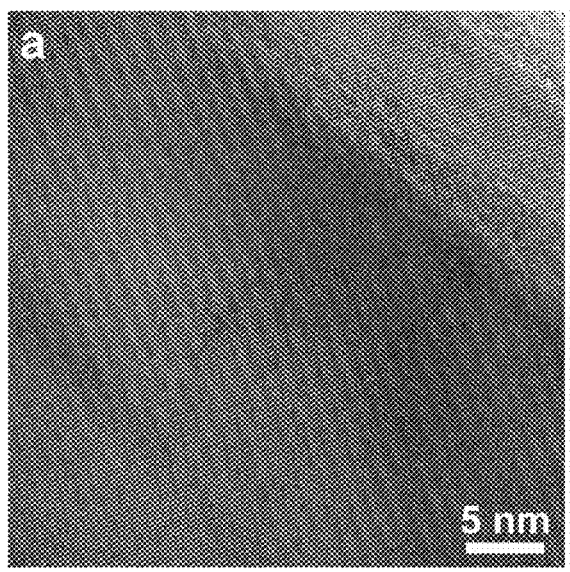
FIGS. 13A-13B are characterizations of 2H-WSe$_2$. (13A) HRTEM image of the commercially available 2H-WSe$_2$, in which the lattice fringe of 0.28 nm indicates the (100) plane of 2H phase. (13B) The corresponding FFT pattern of HRTEM image in (13A), showing characteristic hexagonal structure.
Figure 13B:
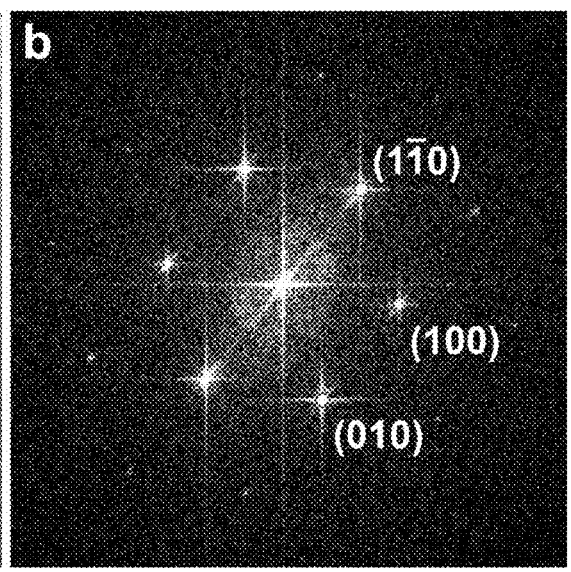
Figure 14:
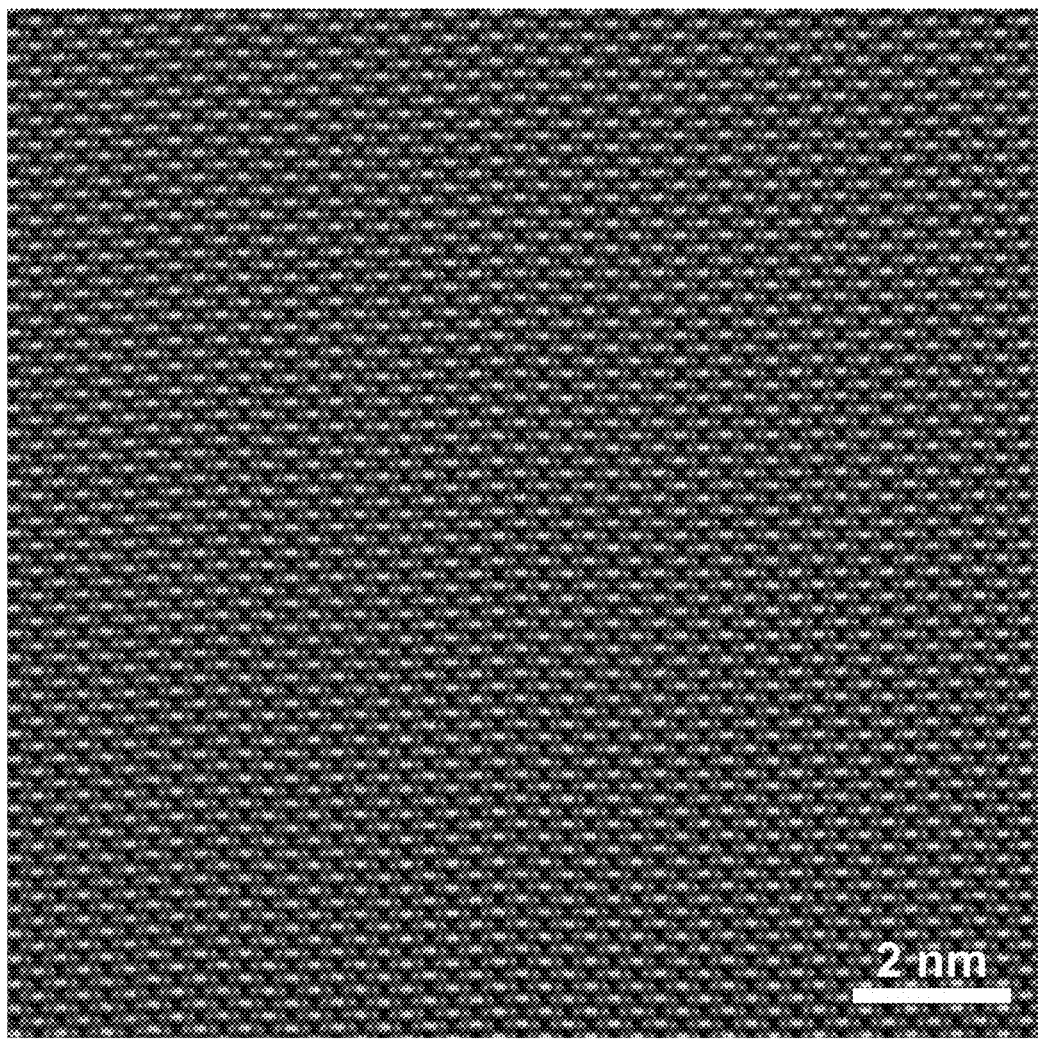
FIG. 14 is a large-area HAADF-STEM images of a mechanically exfoliated double-layered 1T-WSe$_2$ nanosheet.
Figure 15A:
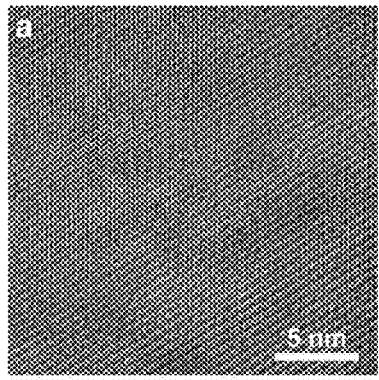
FIGS. 15A-15F Structure characterization of 1T'-MoS$_2$ and 1T'-MoSe$_2$ transformed from 2H-MoS$_2$ and 2H-MoSe$_2$ powders, respectively, with the assistance of K$_2$C$_2$O$_4$·H$_2$O. (15A-15D) HRTEM images of 1T'-MoS$_2$ (15A) and 1T'-MoSe$_2$ (15B), and the corresponding FFT patterns of 1T'-MoS$_2$ (15C) and 1T-MoSe$_2$ (15D). (15E-15F) SAED patterns of 1T'-MoS$_2$ (15E) and 1T'-MoS$_2$ (15F).
Figure 15C:
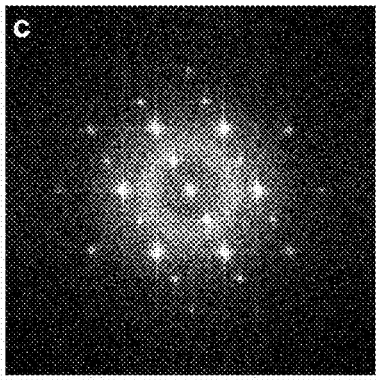
Figure 15E:
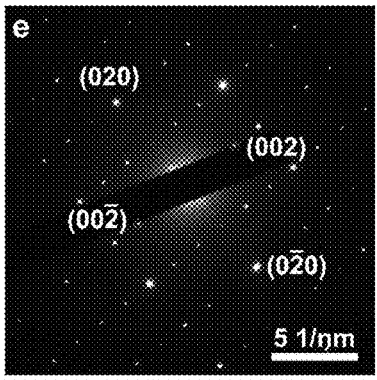
Figure 15B:
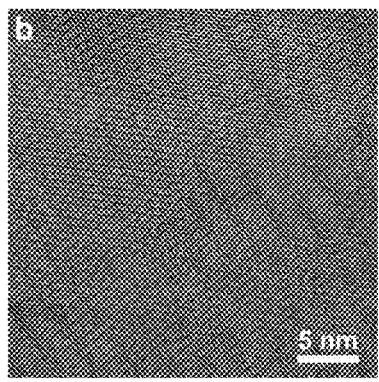
Figure 15D:
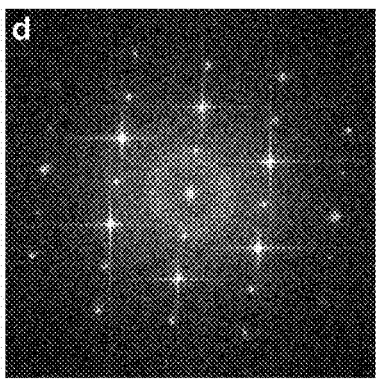
Figure 15F:
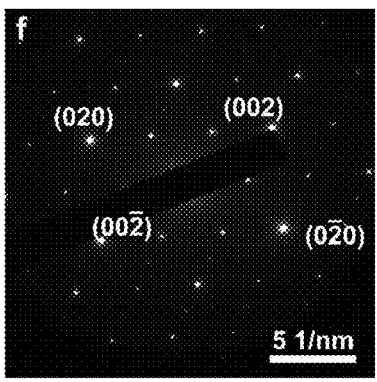

Similarly, HRTEM, SAED and HAADF-STEM were used to investigate the structure and phase purity of the as-prepared 1T'-WSe$_2$ crystals. As shown in FIGS. 4A-4D, the 1T'-WSe$_2$ crystal shows distinctive 1T'-phase structural characteristics, different from that of 2H-WSe$_2$ with hexagonal structure (FIGS. 13A-13B). The HAADF-STEM images of the mechanically exfoliated double-layered 1T'-WSe$_2$ nanosheet (FIGS. 4E-4F and FIG. 14) match the simulated STEM image (FIG. 4G) and the corresponding atomic model (FIG. 4H) perfectly, indicating the pure 1T'-phase structure. The elemental mapping images show the even distribution of W and Se signals in the whole 1T'-WSe$_2$ nanosheets (FIG. 4I-4L). All these results confirm the high phase purity of the obtained 1T'-WSe$_2$ crystals transformed from the commercially available 2H-WSe$_2$ power Importantly, the 1T'-MoS$_2$ and 1T'-MoSe$_2$ crystals transformed from the commercially available 2H-MoS$_2$ and 2H-MoSe$_2$ powers, respectively, have also been characterized by HRTEM and SAED, revealing their pure 1T'-phase structures (see the detailed information in FIGS. 15A-15F).

Figures 16A, 16B, 16C:
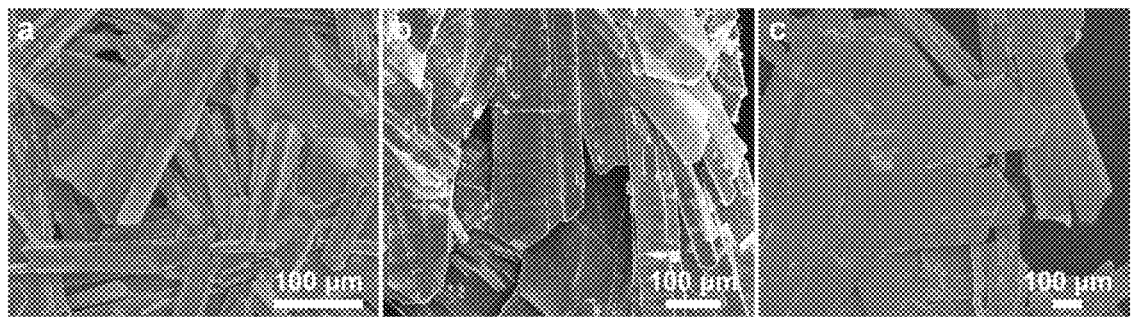
FIGS. 16A-16C are SEM images of 1T'-WS$_{2x}$Se$_{2(1-x)}$ crystals prepared with different ratios of 2H-WS$_2$, selenium powder and K$_2$C$_2$O$_4$·H$_2$O: (16A) 1T'-WS$_{1.51}$Se$_{0.49}$, (16B) 1T'-WS$_{0.97}$Se$_{1.03}$, and (16C) 1T'-WS$_{0.52}$Se$_{1.48}$. These samples exhibit crystal sizes up to a few hundreds of micrometers.
Figures 17A, 17B:
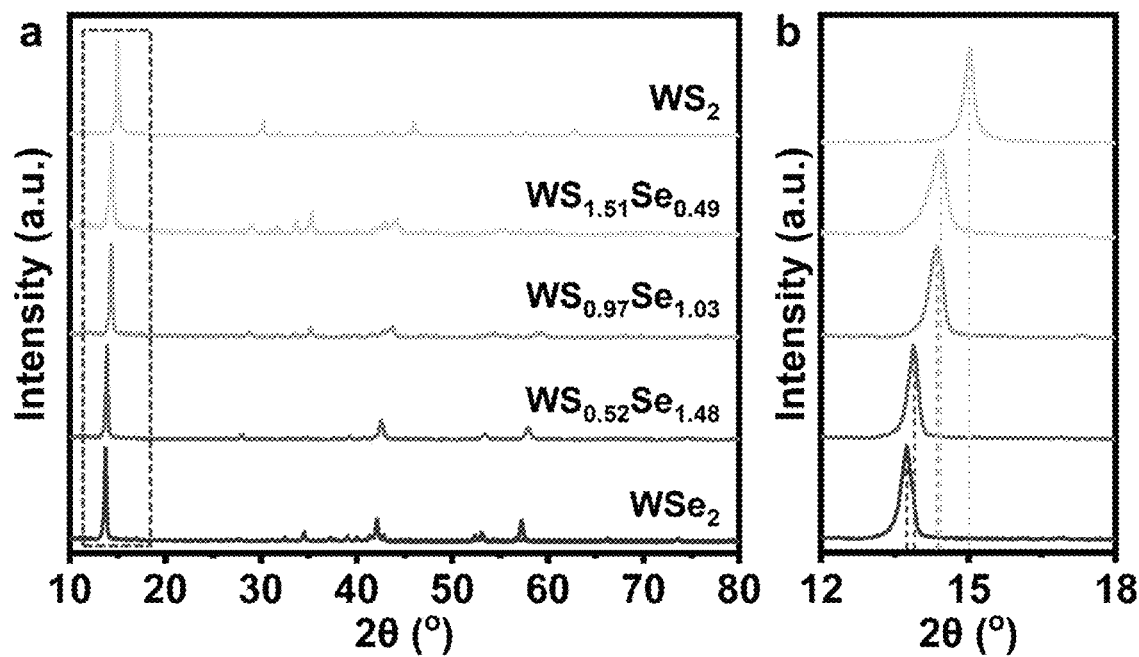
FIGS. 17A-17B are powder XRD patterns of 1T'-WS$_2$, 1T'-WS$_{2x}$Se$_{2(1-x)}$ and 1T'-WSe$_2$. (17A) Comparison of powder XRD patterns of 1T'-WS$_2$, 1T'-WS$_{1.51}$Se$_{0.49}$, 1T'-WS$_{0.97}$Se$_{1.03}$, 1T'-WS$_{0.52}$Se$_{1.48}$ and 1T'-WSe$_2$ crystals. (17B) Magnified XRD patterns of the (200) peaks from the red dashed area in (17A).
Figure 18:
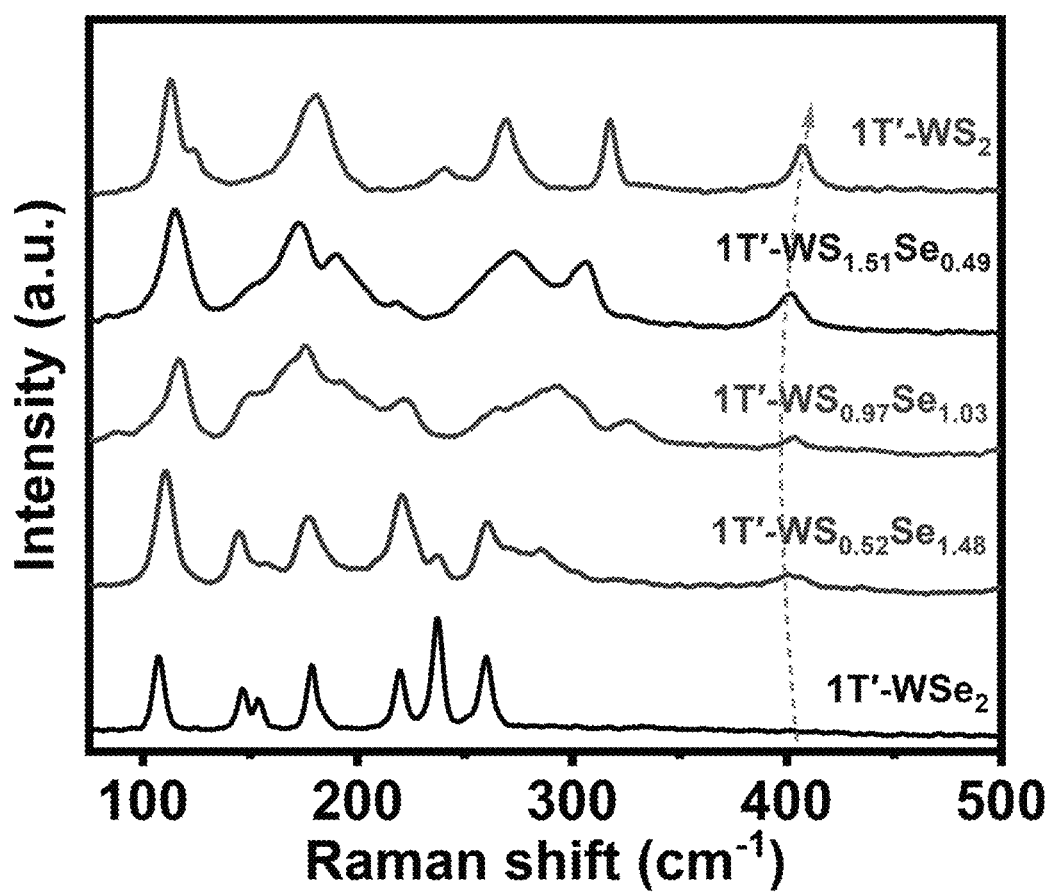
FIG. 18 shows Raman spectra of 1T'-WS$_2$, 1T'-WS$_{1.51}$Se$_{0.49}$, 1T'-WS$_{0.97}$Se$_{1.03}$, 1T'-WS$_{0.52}$Se$_{1.48}$ and 1T'-WSe$_2$.
Figures 19A, 19D, 19G, 19J, 19M:
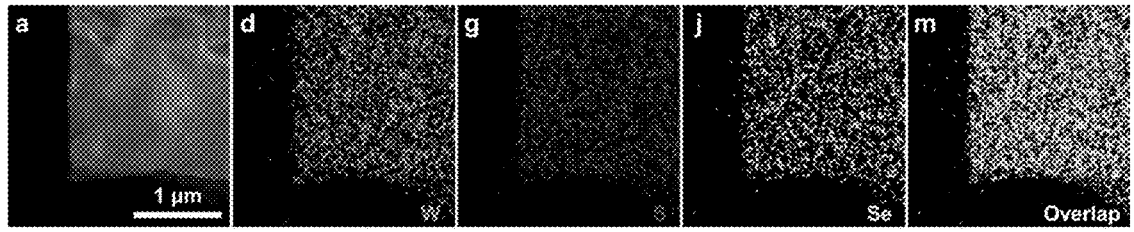
FIGS. 19A-19O are elemental mapping images of 1T'-WS$_{2x}$Se$_{2(1-x)}$ crystals prepared with different ratios of 2H-WS$_2$, selenium powder and K$_2$C$_2$O$_4$·H$_2$O. (19A-19C) Dark-field STEM images of 1T'-WS$_{2x}$Se$_{2(1-x)}$ nanosheets: (19A) 1T'-WS$_{1.51}$Se$_{0.49}$, (19B) 1T'-WS$_{0.97}$Se$_{1.03}$, and (19C) 1T'-WS$_{0.52}$Se$_{1.48}$. (19D-19F) Elemental mapping images of W L signal obtained from 1T'-WS$_{1.51}$Se$_{0.49}$ (19D), 1T'-WS$_{0.97}$Se$_{1.03}$ (19E), and 1T'-WS$_{0.52}$Se$_{1.48}$ (19F). (19G-19I) Elemental mapping images of S K signal obtained from 1T'-WS$_{1.51}$Se$_{0.49}$ (19G), 1T'-WS$_{0.97}$Se$_{1.03}$ (19H), and 1T'-WS$_{0.52}$Se$_{1.48}$ (19I). (19J-19L) Elemental mapping images of Se K signal obtained from 1T'-WS$_{1.51}$Se$_{0.49}$ (19J), 1T'-WS$_{0.97}$Se$_{1.03}$ (19K), and 1T'-WS$_{0.52}$Se$_{1.48}$ (19L). (19M-19O) Overlapped elemental mapping images of W L, S K and Se K signals obtained from 1T'-WS$_{1.51}$Se$_{0.49}$ (19M), 1T'-WS$_{0.97}$Se$_{1.03}$ (19N), and 1T'-WS$_{0.52}$Se$_{1.48}$ (19O).
Figures 19B, 19E, 19H, 19K, 19N:
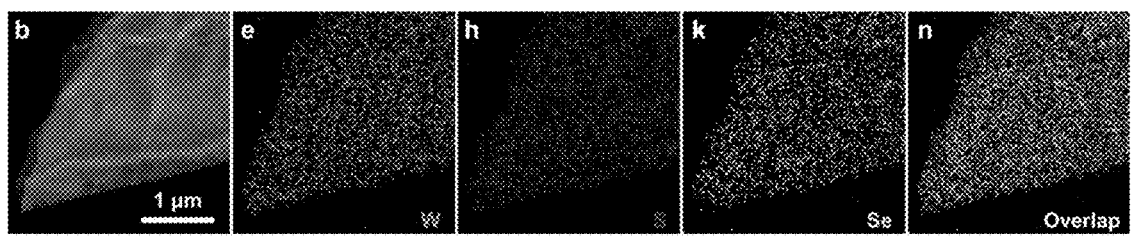
Figures 19C, 19F, 19I, 19L, 19O:
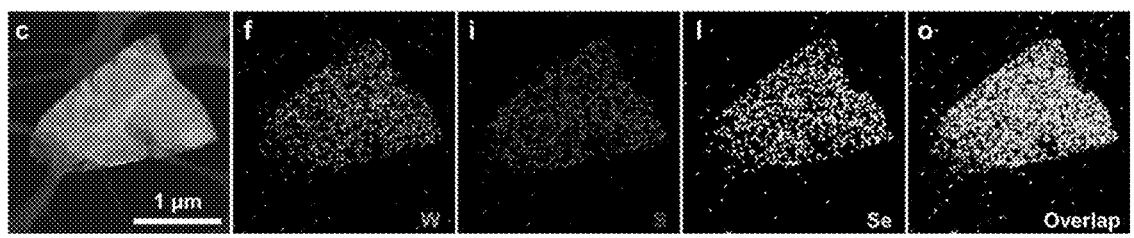

Impressively, by adding certain amounts of selenium powder during the transformation of 2H-WS$_2$ to 1T'-WS$_2$, a series of ternary 1T'-WS$_{2x}$Se$_{2(1-x)}$ crystals with controllable chemical compositions could be easily obtained (see detailed information in Supporting Information). As shown in FIGS. 16A-16C, three as-prepared ternary 1T'-WS$_{2x}$Se$_{2(1-x)}$ (i.e., 1T'-WS$_{1.51}$Se$_{0.49}$, 1T'-WS$_{0.97}$Se$_{1.03}$ and 1T'-WS$_{0.52}$Se$_{1.48}$) crystals exhibit rectangular plate-like morphologies, similar to the 1T'-WS$_2$ (FIGS. 2A, 2E) and 1T'-WSe$_2$ (FIGS. 2B,2F). The crystal structures of these ternary 1T'-WS$_{2x}$Se$_{2(1-x)}$ crystals were further investigated by powder XRD (FIG. 17A-17B), showing a clear and gradual evolution on the positions of (200) diffraction peaks among 1T'-WS$_2$, 1T'-WS$_{1.51}$Se$_{0.49}$, 1T'-WS$_{0.97}$Se$_{1.03}$, 1T'-WS$_{0.52}$Se$_{1.48}$ and 1T'-WSe$_2$, which reveals the successful formation of ternary 1T'-phase alloys. In addition, as shown in FIG. 18, with the composition of Se decreasing from 1 to 0, the Raman peak at ~406 cm$^{-1}$, which is a characteristic peak of 1T'-WS$_2$, becomes more and more obvious, indicating the formation of alloy structures of 1T'-WS$_{1.51}$Se$_{0.49}$, 1T'-WS$_{0.97}$Se$_{1.03}$ and 1T'-WS$_{0.52}$Se$_{1.48}$, which are consistent with the previous report on TMD alloys. Furthermore, elemental mappings of as-prepared 1T'-WS$_{2x}$Se$_{2(1-x)}$ crystals show the strong signals of W, S and Se elements evenly distributed in these samples (FIGS. 19A-19O), indicating their alloyed structures.

Figure 20:
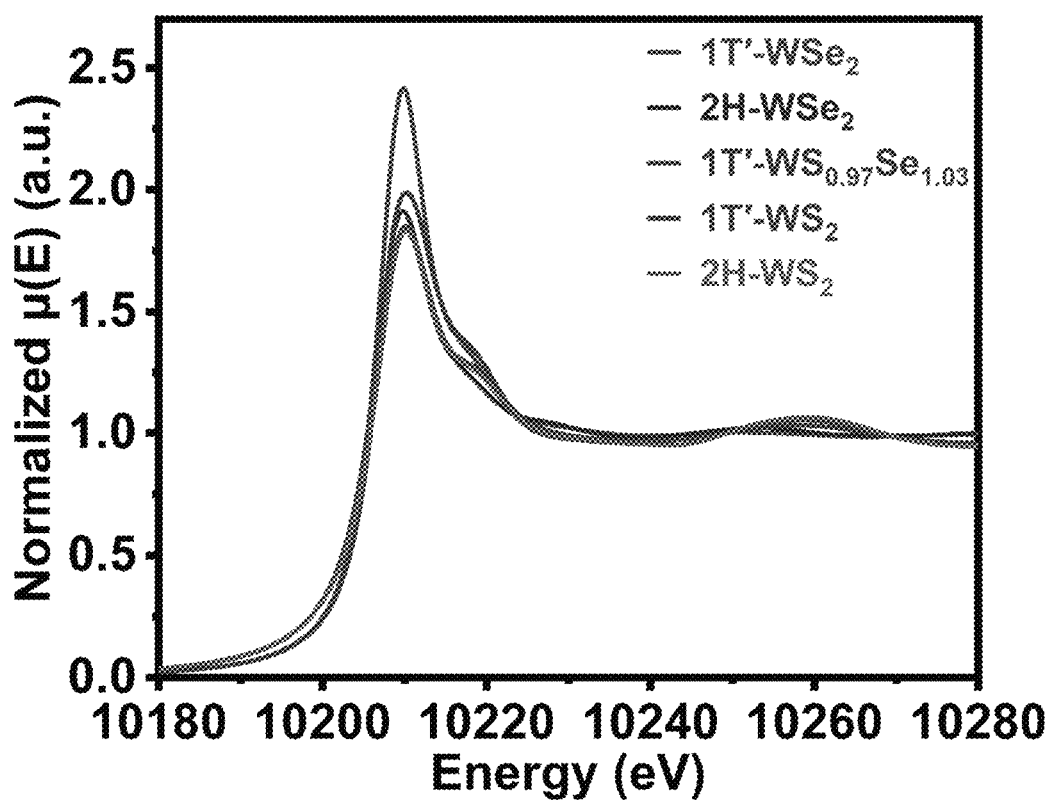
FIG. 20 shows normalized W L$_3$-edge XANES spectra of 1T'-WS$_2$, 2H-WS$_2$, 1T'-WSe$_2$, 2H-WSe$_2$ and 1T'-WS$_{0.97}$Se$_{1.03}$.

Furthermore, XPS and X-ray absorption spectroscopy (XAS) were used to characterize the electronic states of the elements and atomic local structures of the as-formed 1T'-WS$_2$, 1T'-WS$_{0.97}$Se$_{1.03}$ and 1T'-WSe$_2$ crystals. As shown in FIG. 5a, a shift of ~0.9 eV to lower binding energy in the 4f$_{7/2}$ (31.6 eV) and 4f$_{5/2}$ (33.8 eV) peaks of 1T'-WS$_2$ was observed as compared with the 4f$_{7/2}$ (32.5 eV) and 4f$_{5/2}$ (34.7 eV) peaks of 2H-WS$_2$, revealing the lower valence state of W elements in the as-formed 1T'-WS$_2$ crystals. Similarly, the W 4f$_{7/2}$ (31.4 eV) and 4f$_{5/2}$ (33.6 eV) peaks of 1T'-WSe$_2$ crystals also show lower values than those measured from 2H-WSe$_2$ (FIG. 5B), indicating the formation of 1T'-phase structure. Moreover, XANES and EXAFS characterizations were performed to investigate the local coordination environment of W in the as-formed 1T'-WS$_2$, 1T'-WS$_{0.97}$Se$_{1.03}$, 1T'-WSe$_2$ crystals and the corresponding 2H-phase counterparts. The W L$_3$-edge XANES spectra of 1T'-WS$_2$, 1T'-WS$_{0.97}$Se$_{1.03}$ and 1T'-WSe$_2$ exhibit different characteristics as compared with those of 2H-TMDs, due to the structural difference between 1T' and 2H phases (FIG. 20). Moreover, as shown in the Fourier transform (FT) of EXAFS spectra (FIG. 5C-5D) and the fitting results (Table 1), the peaks located at ~3.16 Å (2H-WS$_2$) and ~3.28 Å (2H-WSe$_2$) are assigned to the features of W-W bonds, which are the evidence for the symmetric hexagonal 2H-phase structures. Compared with 2H-WS$_2$ and 2H-WSe$_2$, shorter W-W bonds with the value of ~2.77 Å and ~2.78 Å were observed from the FT of EXAFS of 1T'-WS$_2$ and 1T'-WSe$_2$ (FIG. 5C-5D and Table 1), respectively, showing characteristic features of the distorted 1T' phase, which are consistent with the observation of W zigzag chains in HAADF-STEM images (FIGS. 3E, 3F and FIGS. 4E, 4F). As the EXAFS measurement is highly sensitive to the atomic local structure of materials, the perfect match between experimental and fitting curves also strongly indicates the formation of highly pure 1T'-phase structures in the as-prepared 1T'-WS$_2$ and 1T'-WSe$_2$ crystals (FIGS. 5C, 5D).

TABLE 1

Fitting results of Fourier transform of W L$_3$-edge EXAFS spectra for 1T'-WS$_2$, 2H-WS$_2$, 1T'-WSe$_2$ and 2H-WSe$_2$.

| Sample | Path | N | R (Å) | $\sigma^2$ (10$^{-3}$ Å$^2$) |
|---|---|---|---|---|
| 1T'-WS$_2$ | W—S | 5.7 ± 0.6 | 2.42 ± 0.01 | 3.6 ± 0.5 |
|  | W—W | 4.0 ± 0.4 | 2.77 ± 0.01 | 6.6 ± 1.4 |
| 2H-WS$_2$ | W—S | 6.0* | 2.41 ± 0.01 | 1.9 ± 0.4 |
|  | W—W | 6.0* | 3.16 ± 0.01 | 2.9 ± 0.7 |
| 1T'-WSe$_2$ | W—Se | 6.5 ± 0.7 | 2.56 ± 0.01 | 6.3 ± 0.8 |
|  | W—W | 1.1 ± 0.1 | 2.78 ± 0.01 | 1.8 ± 0.2 |
| 2H-WSe$_2$ | W—Se | 6.0* | 2.53 ± 0.01 | 1.9 ± 0.5 |
|  | W—W | 6.0* | 3.28 ± 0.01 | 4.7 ± 1.5 |

*These parameters were fixed during the fitting.

Figure 21:
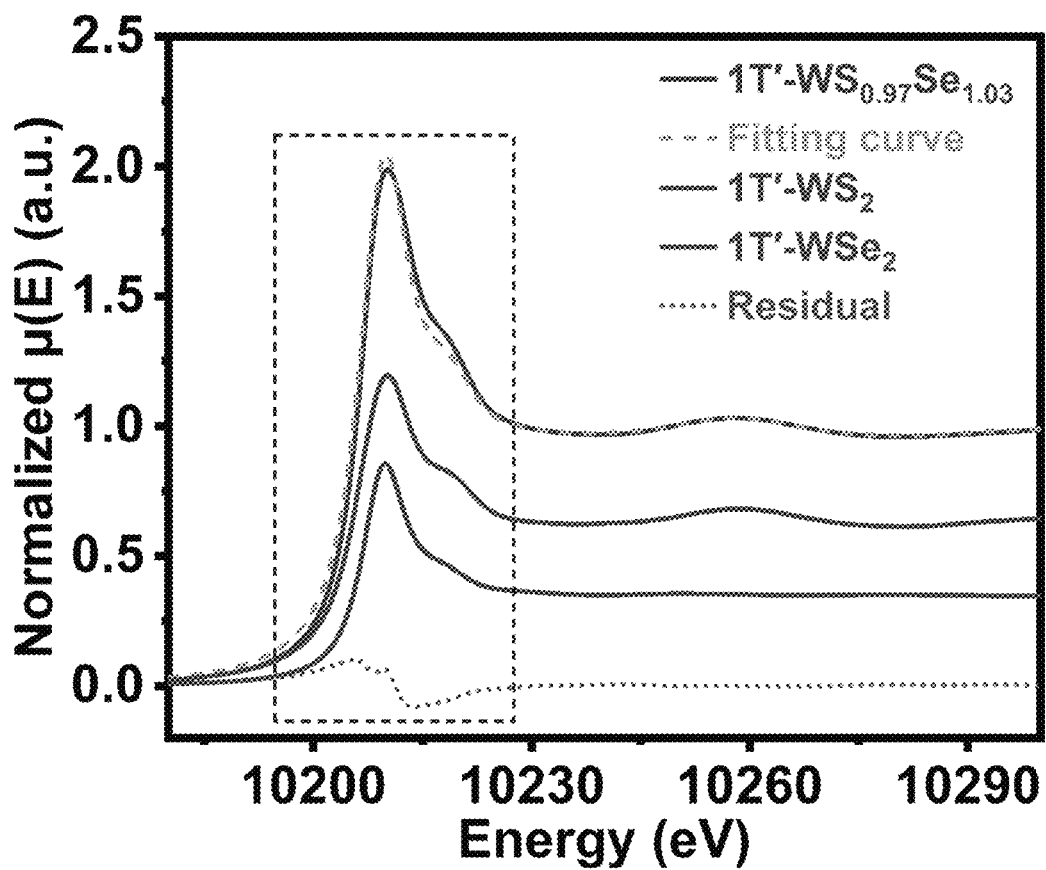
FIG. 21 shows normalized W $L_3$-edge XANES spectrum of 1T'-$WS_{0.97}Se_{1.03}$ and the fitted curve obtained by the linear combination of normalized W $L_3$-edge XANES spectra of 1T'-$WS_2$ and 1T'-$WSe_2$. The blue dashed area shows a noticeable discrepancy between the experimental and fitted results, indicating that the as-prepared 1T'-$WS_{0.97}Se_{1.03}$ is not the mixture of 1T'-$WS_2$ and 1T'-$WSe_2$. The residual curve is the difference between the experimental and fitting data.
Figure 22:
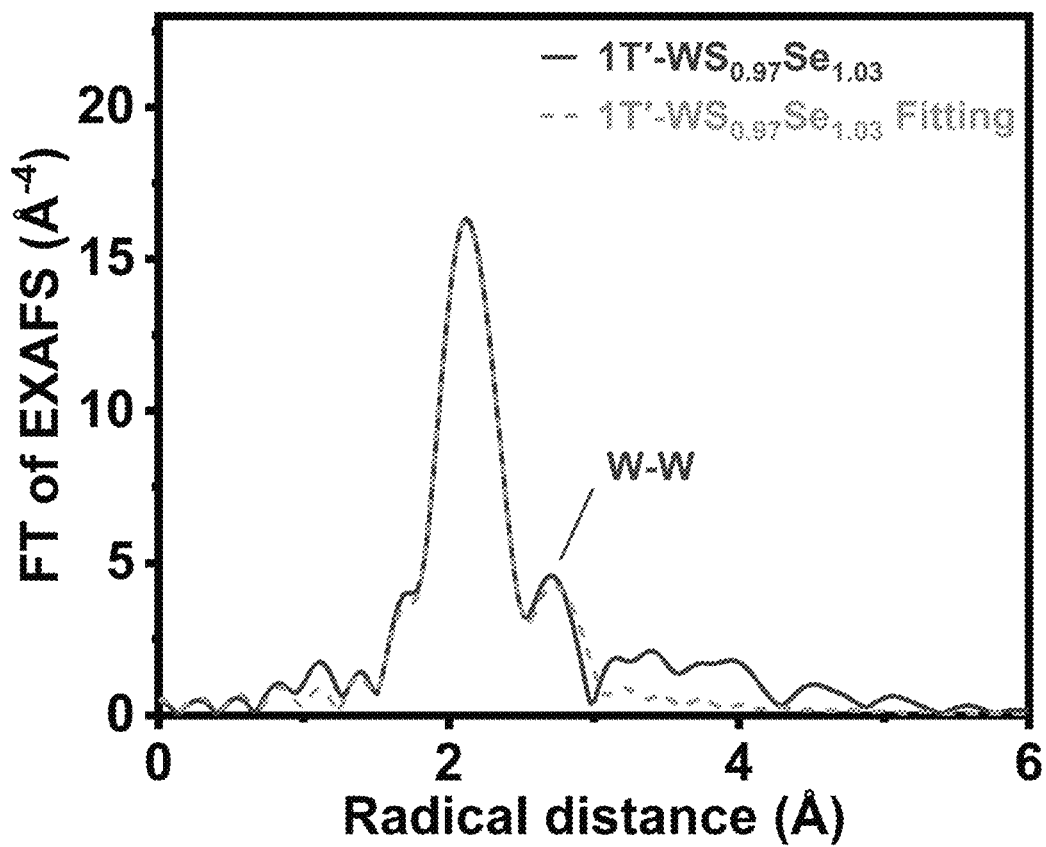
FIG. 22 shows experimental data (solid curve) and fitting results (dash curve) of the Fourier transform of W $L_3$-edge EXAFS spectrum of 1T'-$WS_{0.97}Se_{1.03}$.

In addition, when comparing the XANES spectrum of 1T'-WS$_{0.97}$Se$_{1.03}$ with those of 1T'-WS$_2$ and 1T'-WSe$_2$ (FIG. 21), there is a noticeable discrepancy between the experimental and the fitted results, indicating that the as-prepared 1T'-WS$_{0.97}$Se$_{1.03}$ is alloyed TMD crystal instead of the mixture of 1T'-WS$_2$ and 1T'-WSe$_2$. The short W-W bond (~2.78 Å) was also observed from the FT of EXAFS of 1T'-WS$_{0.97}$Se$_{1.03}$, exhibiting the unique structural characteristics of 1T' phase (FIG. 22).

Figure 9A:
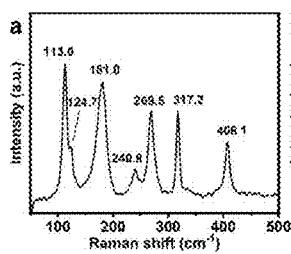
FIGS. 9A-9H are Raman spectra of 1T'-TMD crystals transformed from the corresponding 2H-TMD powders with the assistance of two different metal salts. (9A-9D) Raman spectra of (9A) 1T'-WS$_2$, (9B) 1T'-WSe$_2$, (9C) 1T'-MoS$_2$, and (9D) 1T'-MoSe$_2$ crystals transformed from their corresponding 2H-phase materials with the assistance of K$_2$C$_2$O$_4$·H$_2$O. (9E-9H) Raman spectra of (9E) 1T'-WS$_2$, (9F) 1T'-WSe$_2$, (9G) 1T'-MoS$_2$, and (9H) 1T'-MoSe$_2$ crystals transformed from their corresponding 2H-phase materials with the assistance of K$_2$CO$_3$.
Figure 9B:
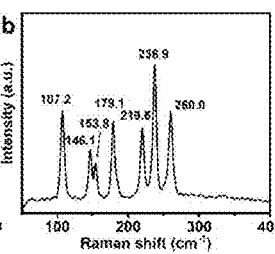
Figure 9C:
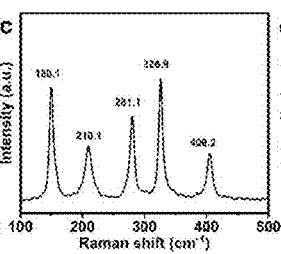
Figure 9D:
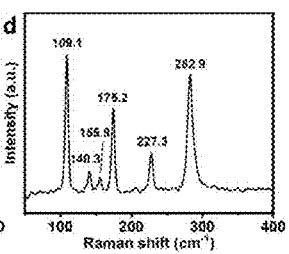
Figure 9E:
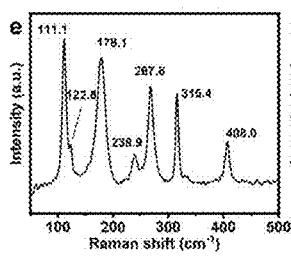
Figure 9F:
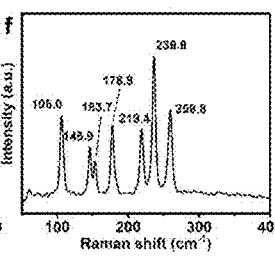
Figure 9G:
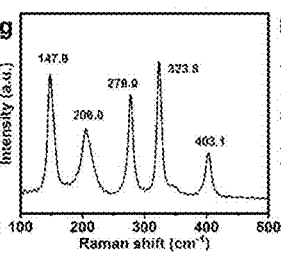
Figure 9H:
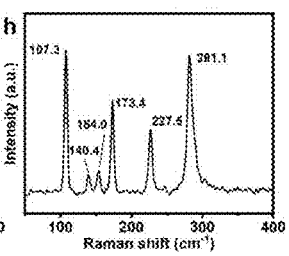

Besides K$_2$C$_2$O$_4$·H$_2$O and K$_2$CO$_3$ (FIG. 2), other metal salts, such as Na$_2$CO$_3$, Rb$_2$C$_3$, Cs$_2$CO$_3$, KHCO$_3$, NaHCO$_3$ and Na$_2$C$_2$O$_4$, may be used to assist the 2H-to-1T' phase transformation of transition metal dichalcogenides. Taking WS$_2$ as an example, with the assistance of Na$_2$CO$_3$, Rb$_2$C$_3$, Cs$_2$CO$_3$, KHCO$_3$, NaHCO$_3$ or Na$_2$C$_2$O$_4$, 1T'-WS$_2$ crystals with rectangular plate-like morphology can be readily obtained using commercially available 2H-WS$_2$ powder as the starting material (FIGS. 23A-23F). As shown in FIGS. 24A-24F, all these as-prepared 1T'-WS$_2$ crystals exhibit unique characteristic Raman spectra, which are consistent with previously reported data and also the results measured on the 1T'-WS$_2$ crystals prepared with the assistance of K$_2$C$_2$O$_4$·H$_2$O and K$_2$CO$_3$ (FIGS. 9A, 9E).

EXAMPLES

Chemicals. Tungsten disulfide (WS$_2$, 99.8%), tungsten diselenide (WSe$_2$, 99.8%), and molybdenum diselenide (MoSe$_2$, 99.9%) were purchased from Alfa Aesar (U.S.A). Molybdenum disulfide (MoS$_2$, 98%), sulfur powder (S, 99.98%), potassium carbonate (K$_2$CO$_3$, 99%), rubidium carbonate (Rb$_2$C$_3$, 99.8%), and cesium carbonate (Cs$_2$CO$_3$, 99.9%) were purchased from Sigma-Aldrich (Germany). Selenium powder (Se, ≥99.99%), potassium oxalate monohydrate (K$_2$C$_2$O$_4$·H$_2$O, 99.8%), potassium bicarbonate (KHCO$_3$, 99.9%), sodium carbonate (Na$_2$CO$_3$, 99.5%), sodium bicarbonate (NaHCO$_3$, 99.8%), and sodium oxalate (Na$_2$C$_2$O$_4$, 99.99%) were purchased from Aladdin (China). Iodine (I$_2$, 98%) was purchased from Tokyo Chemical Industry Company Limited (Japan). Ultra-high purity (99.999%) H$_2$ and Ar were purchased from Linde HKO Limited (Hong Kong, China). Acetonitrile (CH$_3$CN) was purchased from DUKSAN REAGENTS (South Korea). Ethanol (C$_2$H$_5$OH) was purchased from Anaqua Global International Inc. Limited (U.S.A.). The Milli-Q water with a resistivity of 18.2 MΩ·cm at room temperature used in our experiments was obtained from the Milli-Q purification system (EQ7000, U.S.A.).

Phase Transformation of Transition Metal Dichalcogenides (TMDs) from 2H to 1T' Phases Assisted by K$_2$C$_2$O$_4$·H$_2$O.

Transformation of WS$_2$ from 2H phase to 1T' phase. In a typical experiment, 1.0 mmol of 2H-WS$_2$ powders were mixed with K$_2$C$_2$O$_4$·H$_2$O and S powders with a molar ratio of 1:1.1:10, and then ground for 10 min in an agate mortar. The obtained uniform mixture was transferred to an alumina crucible, which was placed at the center of a quartz tube with a diameter of 2.5 cm. Subsequently, the quartz tube was subjected to vacuum and refilled with Ar for three times to remove the air inside the tube. After that, the tube was purged with a H$_2$ (30%)/Ar (70%) mixed gas with the total flow rate of 100 s.c.c.m (standard cubic centimeter per minute) for 15 min. Then, the tube was placed into the tube furnace preheated at 800° C. and maintained for 4 h. After that, the tube furnace was powered off and cooled down to room temperature naturally. The resultant product was then washed with Milli-Q water until the pH value of the suspension reached ~7.0. Afterwards, the suspension was immersed in Milli-Q water for 24 h, which was then transferred into an I$_2$ acetonitrile solution (1.5 g/50 mL) for another 24 h. After that, the product was washed with fresh acetonitrile a few times to completely remove the I$_2$ residue. Finally, after drying in a vacuum oven at room temperature, the 1T'-WS$_2$ crystals were obtained. The yield of 1T'-WS$_2$ after reaction may be as high as 53%. The loss of WS$_2$ may be induced by the evaporation of product at high temperature and loss during the collecting process.

Transformation of WSe$_2$ from 2H phase to 1T' phase. 1T'-WSe$_2$ crystals were obtained via a similar method used to transform 2H-WS$_2$ into 1T'-WS$_2$, except that 1.0 mmol of 2H-WSe$_2$ powers were mixed with K$_2$C$_2$O$_4$·H$_2$O and Se powders with a molar ratio of 1:1.1:6. The final 1T'-WSe$_2$ crystals may be obtained by washing the resultant products after high temperature treatment with Milli-Q water and pure acetonitrile solution.

Transformation of MoS$_2$ from 2H phase to 1T' phase. Similar to the process used for the phase transformation of WS$_2$, 1T'-MoS$_2$ can be obtained by the transformation of 2H-MoS$_2$ using a similar method, except for the following two differences: (1) 1.0 mmol of 2H-MoS$_2$ powders were mixed with K$_2$C$_2$O$_4$·H$_2$O and S powders with a molar ratio of 1:1.5:10; (2) The treatment temperature was changed from 800° C. to 850° C.

Transformation of MoSe$_2$ from 2H phase to 1T' phase. Similar to the process used for the phase transformation of WSe$_2$, 1T'-MoSe$_2$ can be obtained by the transformation of 2H-MoSe$_2$ using a similar method, except for the following two differences: (1) 1.0 mmol of 2H-MoSe$_2$ powders were mixed with K$_2$C$_2$O$_4$·H$_2$O and Se powders with a molar ratio of 1:1.5:6; (2) The treatment temperature was changed from 800° C. to 850° C.

Formation of 1r-WS$_{2x}$Se$_{2(1-x)}$ ternary crystals. The preparation of 1T'-WS$_{2x}$Se$_{2(1-x)}$ ternary crystals can be realized by a similar method used for the phase transformation of WS$_2$ with a slight modification. In a typical process, the starting mixture was 1.0 mmol of 2H-WS$_2$ powders, 1.1 mmol of K$_2$C$_2$O$_4$·H$_2$O and y mmol Se powders, where y plays an important role in the formation of 1T'-WS$_{2x}$Se$_{2(1-x)}$ with different chemical compositions. For instance, the ratio of S and Se in the obtained 1T'-WS$_{2x}$Se$_{2(1-x)}$ ternary crystals is close to 1:3, 1:1, and 3:1, when y is 6.0, 2.5 and 1.0, respectively. The reaction temperature was changed from 800° C. to 850° C.

Phase transformation of WS$_2$, WSe$_2$, MoS$_2$ and MoSe$_2$ from 2H phase to 1T' phase assisted by K$_2$CO$_3$. The procedures for the phase transformation of 2H-TMDs into 1T'-TMDs with the assistance of K$_2$CO$_3$ were same as those using K$_2$C$_2$O$_4$·H$_2$O, except that K$_2$C$_2$O$_4$·H$_2$O was replaced by K$_2$CO$_3$.

Phase Transformation of WS$_2$ from 2H Phase to 1T' Phase Assisted by Na$_2$CO$_3$, Rb$_2$C$_3$, Cs$_2$CO$_3$, KHCO$_3$, NaHCO$_3$ or Na$_2$C$_2$O$_4$.

The transformation of WS$_2$ from 2H phase to 1T' phase can be realized with the assistance of Na$_2$CO$_3$, Rb$_2$C$_3$, Cs$_2$CO$_3$, KHCO$_3$, NaHCO$_3$ or Na$_2$C$_2$O$_4$. The transformation procedures are same to those using K$_2$C$_2$O$_4$·H$_2$O (or K$_2$CO$_3$), except that K$_2$C$_2$O$_4$·H$_2$O (or K$_2$CO$_3$) was replaced by Na$_2$CO$_3$, Rb$_2$C$_3$, Cs$_2$CO$_3$, KHCO$_3$, NaHCO$_3$ or Na$_2$C$_2$O$_4$. Note that the amount of KHCO$_3$ and NaHCO$_3$ used for the phase transformation is twice as that of other metal salts.

Formation of 1T'-MoS$_{2x}$Se$_{2(1-x)}$ ternary crystals. The 1T'-MoS$_{2x}$Se$_{2(1-x)}$ ternary crystals were prepared with a similar method to synthesize 1T'-MoS$_2$ crystals. In this procedure, the starting mixture was 1 mmol 2H-MoS$_2$ powders, 1.1 mmol K$_2$C$_2$O$_4$·H$_2$O, and y mmol Se powders, where y plays an important role in the formation of 1T'-MoS$_{2x}$Se$_{2(1-x)}$ ternary crystals with different chemical compositions. For instance, the ratio of S and Se in the obtained 1T'-MoS$_{2x}$Se$_{2(1-x)}$ ternary crystals is close to 1:3, 1:1, and 3:1, when y is 6.0 mmol, 2.5 mmol, or 1.0 mmol. The reaction temperature was 850° C.

Characterizations. Scanning electron microscope (SEM) images and energy-dispersive X-ray spectroscopy (EDS) spectra were recorded on a scanning electron microscope (Thermo Fisher Scientific, QUATTRO S) equipped with an EDS detector. Transmission electron microscope (TEM) images, high-resolution TEM (HRTEM) images and selected area electron diffraction (SAED) patterns were obtained on a JEOL JEM-2100F (JEOL, Tokyo, Japan) transmission electron microscope operated at the accelerating voltage of 200 kV. High-angle annular dark-field (HAADF) scanning transmission electron microscope (STEM) images were taken at the voltage of 200 kV on a JEOL ARM200F (JEOL, Tokyo, Japan) spherical aberration-corrected transmission electron microscope. Rigaku SmartLab and Bruker D8 ADVANCE X-ray powder diffractometers, using Cu Kα radiation source (λ=1.5406 Å), were used to measure the X-ray diffraction (XRD) patterns of all the samples. X-ray photoelectron spectroscopy (XPS) spectra were recorded on the ESCALAB 250Xi (Thermo Fisher Scientific) system. The XPS results were calibrated with the reference C 1s peak located at 284.6 eV. Raman spectra were obtained on a WITec system (Germany) with the excitation wavelength of 532 nm. The extended X-ray absorption fine structure (EXAFS) and X-ray absorption near edge structure (XANES) of W L$_3$-edge were performed at the 7-BM/QAS beamline of the National Synchrotron Light Source II (NSLS-II). The storage ring of NSLS-II operated at E=3 GeV and I=400 mA under the top-off mode. The X-ray radiation was monochromatized by the Si (111) channel-cut monochromator. W foil was used as a reference for energy calibration, and all samples were measured in the transmission mode at room temperature. Demeter software package was used for the data processing and fitting of all the measured data.

INDUSTRIAL APPLICABILITY

The present invention provides a simple, feasible, robust process that streamlines the complex and multiple-step prior processes into a one-step gas-solid reaction, which greatly reduces the synthetic difficulty and increases the reproducibility. The starting materials are inexpensive and commercially available, decreasing the production cost of the product. The synthesis of some 1T'-phase selenides directly produces products free of alkali metal ions (that is, they do not require any alkali ion removal process), showing higher purity compared with previous products. Various group VI transition metal dichalcogenides, including $WS_2$, $WSe_2$, $MoS_2$, $MoSe_2$ and 1T'-$WS_{2x}Se_{2(1-x)}$, are transformed from the conventional thermodynamically stable 2H phase to the unconventional metastable 1T' phase with the assistance of alkali metal salts such as $K_2C_2O_4 \cdot H_2O$ or $K_2CO_3$.

Other commercially available metal salts such as $Na_2CO_3$, $Rb_2C_3$, $Cs_2CO_3$, $KHCO_3$, $NaHCO_3$ and $Na_2C_2O_4$, can also be used to transform 2H-$WS_2$ to 1T'-$WS_2$. The results permit the preparation of unconventional metastable 1T'-TMDs for fundamental and practical investigations, as well as greatly simplifying the procedures for the large-scale production of 1T'-TMDs. The approach may be applied to the field of phase engineering of nanomaterials, which may also be used for preparation of other materials with various polymorphs.

The prepared materials may be used in electrocatalysis (e.g., $CO_2$ reduction reaction and hydrogen evolution reaction), energy storage (supercapacitors) and condensed matter physics (e.g., superconductivity).

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit, and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A method for phase transformation of transition metal dichalcogenides from a stable phase to a metastable phase, comprising:
    mixing a phase 2H or 3R transition metal dichalcogenide with an alkali metal salt;
    heating the mixed 2H or 3R transition metal dichalcogenide with alkali metal salt at a temperature of 700-1000° C. in a reducing atmosphere to form a reaction product; and
    recovering a 1T or 1T' metastable phase of the transition metal dichalcogenide from the reaction product.

2. The method for phase transformation of transition metal dichalcogenides according to claim 1, wherein the transition metal dichalcogenide is selected from one or more of $WS_2$, $WSe_2$, $MoS_2$, $MoSe_2$, $WS_{2x}Se_{2(1-x)}$ and $MoS_{2x}Se_{2(1-x)}$, $TaS_2$, $TaSe_2$, $TiS_2$, $TiSe_2$, $ReS_2$, $ReSe_2$, $NbS_2$, and $NbSe_2$.

3. The method for phase transformation of transition metal dichalcogenides according to claim 1, wherein the metal salt is selected from one or more of $K_2C_2O_4 \cdot H_2O$, $Na_2C_2O_4$, $K_2CO_3$, $Na_2CO_3$, $Cs_2CO_3$, $Rb_2C_3$, $KHCO_3$, and $NaHCO_3$.

4. The method for phase transformation of transition metal dichalcogenides according to claim 1, wherein the reducing atmosphere includes hydrogen.

5. The method for phase transformation of transition metal dichalcogenides according to claim 1, wherein the recovering of the 1T or 1T' metastable phase of the transition metal dichalcogenide from the reaction product includes washing with water and an $I_2$ acetonitrile solution.

6. The method for phase transformation of transition metal dichalcogenides according to claim 1, wherein a ratio of the transition metal dichalcogenide to the alkali metal salt is approximately 1:1 to approximately 1:2.

7. The method for phase transformation of transition metal dichalcogenides according to claim 1, further comprising mixing an additional amount of a chalcogen component of the selected transition metal dichalcogenide.

8. The method for phase transformation of transition metal dichalcogenides according to claim 7, wherein the additional amount of the chalcogen component is added in a ratio of approximately 1:4 to approximately 1:12 where the ratio is of the selected transition metal dichalcogenide to the chalcogen.

9. The method for phase transformation of transition metal dichalcogenides according to claim 1, wherein the heating is from approximately 3 hours to approximately 8 hours.

10. The method for phase transformation of transition metal dichalcogenides according to claim 1, wherein the temperature is approximately 800-850° C.

* * * * *